:::: {.columns}
::: {.column}
(12) United States Patent
Goldberg et al.

(54) SENSING, INTERLOCKING SOLAR PANEL SYSTEM AND INSTALLATION METHOD

(71) Applicant: Smash Solar, Inc., Richmond, CA (US)

(72) Inventors: Neil Goldberg, Berkeley, CA (US); Troy Douglas Tyler, El Cerrito, CA (US); Eugene Kim, Orinda, CA (US); Bron Davis, Vacaville, CA (US); David Schultz, Berkeley, CA (US); Miguel Martinho Lopes Praca, Kentfield, CA (US); John Wolfe, Berkeley, CA (US)

(73) Assignee: Smash Solar, Inc., Richmond, CA (US)

( * ) Notice: Subject to any disclaimer, the term of this patent is extended or adjusted under 35 U.S.C. 154(b) by 3 days.

(21) Appl. No.: 15/748,653

(22) PCT Filed: Jul. 27, 2016

(86) PCT No.: PCT/US2016/044151
§ 371 (c)(1),
(2) Date: Jan. 29, 2018

(87) PCT Pub. No.: WO2017/019719
PCT Pub. Date: Feb. 2, 2017

(65) Prior Publication Data
US 2019/0006983 A1    Jan. 3, 2019

Related U.S. Application Data

(63) Continuation-in-part of application No. 14/521,245, filed on Oct. 22, 2014, now Pat. No. 10,135,386,
(Continued)

(51) Int. Cl.
*H02S 30/10*    (2014.01)
*H02S 20/24*    (2014.01)
(Continued)
:::

::: {.column}
(10) Patent No.:     US 10,536,108 B2
(45) Date of Patent:        Jan. 14, 2020

(52) U.S. Cl.
CPC .............. *H02S 20/24* (2014.12); *H02S 20/20* (2014.12); *H02S 20/30* (2014.12); *H02S 30/10* (2014.12);
(Continued)

(58) Field of Classification Search
CPC .......... H02S 20/24; H02S 20/20; H02S 20/30; H02S 30/10; H02S 40/36
See application file for complete search history.

(56) References Cited

U.S. PATENT DOCUMENTS 3,685,863 A  *  8/1972  Oetiker ................. E04B 1/2403
                                                    403/286
4,111,188 A  *  9/1978  Murphy, Jr. ............ F24S 20/67
                                                    126/622
(Continued)

FOREIGN PATENT DOCUMENTS

WO     2011/154019 A1    12/2011
WO     2017/019719 A2     2/2017
WO     2017/019719 A3     3/2017

OTHER PUBLICATIONS

PCT Invitation to Pay Additional Fees and, Where Applicable, Protest Fee, for PCT Application No. PCT/US16/44151, International filing date: Aug. 11, 2016; Invitation dated Nov. 28, 2016, 2 pages.
(Continued)

*Primary Examiner* — Golam Mowla
(74) *Attorney, Agent, or Firm* — SF Bay Area Patents, LLC; Andrew V. Smith

(57)     ABSTRACT

A preassembled solar panel module includes a solar panel configured for receiving and converting solar radiation to produce electrical power. Multiple panel rails are coupled in preassembly to a backside surface of the solar panel, including at least two panel rails disposed halfway or more along opposing longest edges of the solar panel. Multiple snap
(Continued)
:::
::::

connector components are each coupled to one of the at least two rails and are each configured to couple with a complimentary snap connector component of an adjacent preassembled solar panel module or of a wind deflector accessory, or both. One or more mounting feet are each coupled at a selected location to one of the at least two panel rails and are each configured for coupling at a selected location to a roof or to other sunlight receiving surface.

20 Claims, 36 Drawing Sheets

Related U.S. Application Data which is a continuation-in-part of application No. 14/054,807, filed on Oct. 15, 2013, now abandoned, application No. 15/748,653, which is a continuation-in-part of application No. 15/138,437, filed on Apr. 26, 2016, now abandoned, and a continuation-in-part of application No. PCT/US2016/000019, filed on Mar. 2, 2016.

(60) Provisional application No. 62/326,811, filed on Apr. 24, 2016, provisional application No. 62/260,321, filed on Nov. 26, 2015, provisional application No. 62/209,860, filed on Aug. 25, 2015, provisional application No. 62/203,902, filed on Aug. 11, 2015, provisional application No. 62/203,304, filed on Aug. 10, 2015, provisional application No. 62/197,564, filed on Jul. 27, 2015, provisional application No. 62/321,467, filed on Apr. 12, 2016, provisional application No. 61/712,878, filed on Oct. 12, 2012, provisional application No. 62/152,938, filed on Apr. 26, 2015, provisional application No. 62/127,287, filed on Mar. 2, 2015.

(51) Int. Cl.
    *H02S 40/36*     (2014.01)
    *H02S 20/20*     (2014.01)
    *H02S 20/30*     (2014.01)

(52) U.S. Cl.
    CPC .............. *H02S 40/36* (2014.12); *Y02B 10/12* (2013.01); *Y02B 10/20* (2013.01)

(56) References Cited

U.S. PATENT DOCUMENTS

| | | | | |
|---|---|---|---|---|
| 4,184,476 A * | 1/1980 | McArthur | F24D 5/005 | 126/632 |
| 4,371,139 A * | 2/1983 | Clark | F24S 20/67 | 248/237 |
| 4,421,943 A * | 12/1983 | Withjack | H02S 20/30 | 136/246 |
| 4,429,872 A * | 2/1984 | Capachi | A63C 19/06 | 472/92 |
| 4,896,992 A * | 1/1990 | Muhlethaler | F16B 7/00 | 211/182 |
| 4,991,370 A * | 2/1991 | Gailey | E04B 9/0478 | 52/506.1 |
| 5,143,556 A * | 9/1992 | Matlin | H02S 20/10 | 136/244 |
| 5,164,020 A * | 11/1992 | Wagner | E04D 3/366 | 136/251 |
| 5,197,589 A * | 3/1993 | Gordon | G07F 11/40 | 194/248 |
| 5,460,660 A * | 10/1995 | Albright | H02S 30/10 | 136/251 |
| 5,505,788 A * | 4/1996 | Dinwoodie | F24S 25/40 | 136/246 |
| 5,571,338 A * | 11/1996 | Kadonome | E04D 3/3608 | 136/251 |
| 5,881,713 A * | 3/1999 | Lai | E04D 3/366 | 126/621 |
| 6,058,930 A * | 5/2000 | Shingleton | F24S 30/425 | 126/600 |
| 6,093,884 A * | 7/2000 | Toyomura | E04D 3/366 | 126/621 |
| 6,370,828 B1 * | 4/2002 | Genschorek | F24S 25/632 | 52/200 |
| 6,521,821 B2 * | 2/2003 | Makita | H01L 31/048 | 136/244 |
| 6,784,360 B2 * | 8/2004 | Nakajima | H02S 20/23 | 136/251 |
| 6,959,517 B2 * | 11/2005 | Poddany | E06B 1/6015 | 52/173.3 |
| 7,012,188 B2 * | 3/2006 | Erling | H02S 20/23 | 136/251 |
| 7,435,134 B2 * | 10/2008 | Lenox | H01R 4/64 | 439/567 |
| 7,866,099 B2 * | 1/2011 | Komamine | H02S 20/00 | 52/173.3 |
| 8,567,134 B1 * | 10/2013 | Grushkowitz | H02S 20/32 | 52/173.3 |
| 8,816,189 B2 | 8/2014 | Janssens et al. | | |
| 9,431,953 B2 * | 8/2016 | Stearns | H02S 20/23 | |
| 9,447,988 B2 * | 9/2016 | Stearns | E04D 13/00 | |
| 9,455,662 B2 * | 9/2016 | Meine | H02S 20/23 | |
| 9,712,106 B2 * | 7/2017 | Wentworth | H02S 20/23 | |
| 2002/0096395 A1 * | 7/2002 | Garrett | B23D 45/003 | 182/45 |
| 2004/0187909 A1 * | 9/2004 | Sato | H02S 20/23 | 136/251 |
| 2004/0261955 A1 * | 12/2004 | Shingleton | F24S 20/67 | 160/84.06 |
| 2006/0090789 A1 * | 5/2006 | Thompson | H02S 20/00 | 136/246 |
| 2007/0144575 A1 * | 6/2007 | Mascolo | H02S 20/24 | 136/246 |
| 2008/0029148 A1 * | 2/2008 | Thompson | H02S 20/00 | 136/244 |
| 2008/0230047 A1 * | 9/2008 | Shugar | H02S 20/00 | 126/569 |
| 2009/0014130 A1 * | 1/2009 | Heidenreich | E04F 10/0607 | 160/66 |
| 2009/0120486 A1 | 5/2009 | Buller | | |
| 2009/0199846 A1 * | 8/2009 | Collins | H02S 20/23 | 126/601 |
| 2011/0108083 A1 * | 5/2011 | Ravestein | H02S 20/24 | 136/244 |
| 2012/0125410 A1 * | 5/2012 | West | H02S 20/23 | 136/251 |
| 2012/0145227 A1 * | 6/2012 | Jun | F16B 21/073 | 136/251 |
| 2012/0273029 A1 * | 11/2012 | Bragagna | F24S 25/13 | 136/251 |
| 2012/0298188 A1 * | 11/2012 | West | F24S 25/67 | 136/251 |
| 2012/0298817 A1 * | 11/2012 | West | H02S 20/00 | 248/220.22 |
| 2014/0014158 A1 * | 1/2014 | Wildes | H02S 20/30 | 136/246 |
| 2014/0230877 A1 | 8/2014 | Goldberg et al. | | |
| 2015/0040944 A1 | 2/2015 | Dinwoodie et al. | | |

OTHER PUBLICATIONS

PCT Notification of Transmittal of the International Search Report and the Written Opinion of the International Searching Authority, or the Declaration, for PCT Application No. PCT/US16/44151, dated Jan. 19, 2017, 18 pages.

PCT Notification of Transmittal of International Preliminary Report on Patentability (Chapter II of the Patent Cooperation Treaty,

(56) References Cited

OTHER PUBLICATIONS

IPEA/416) and PCT International Preliminary Report on Patentability (Chapter II of the Patent Cooperation Treaty, IPEA/409), for PCT application No. PCT/US16/44151, report dated Sep. 26, 2017, 20 pages.

* cited by examiner

SCALE 1:1

DETAIL A
SCALE 1 : 1
Note: There are 125 slots

SCALE 1:5

SCALE 1:6

SENSING, INTERLOCKING SOLAR PANEL SYSTEM AND INSTALLATION METHOD

PRIORITY AND RELATED APPLICATIONS

This application claims priority to U.S. provisional patent application Ser. No. (USSN) 62/197,564, filed Jul. 27, 2015, which is incorporated by reference.

This application is also a continuation-in-part (CIP) of U.S. Ser. No. 14/521,245, filed Oct. 22, 2014, which is a CIP of U.S. Ser. No. 14/054,807, filed Oct. 15, 2013, which claims priority to U.S. Ser. No. 61/712,878, filed Oct. 12, 2012, which are incorporated by reference.

This application is also a CIP of U.S. Ser. No. 15/138,437, filed Apr. 26, 2016, which claims priority to U.S. Ser. No. 62/152,938, filed Apr. 26, 2015, which are each incorporated by reference.

This application is also a CIP of PCT/US2016/000019, filed Mar. 2, 2016, which claims priority to U.S. Ser. No. 62/127,287, filed Mar. 2, 2015, which are each incorporated by reference.

This application also claims priority to United States provisional patent applications serial numbers (USSN) 62/321,467, filed Apr. 12, 2016, and USSN 62/326,811, filed Apr. 24, 2016, and USSN 62/203,304, filed Aug. 10, 2015, and USSN 62/260,321, filed Nov. 26, 2015, and USSN 62/209,860, filed Aug. 25, 2015, and USSN 62/203,902, filed Aug. 11, 2015, which are each incorporated by reference.

GOVERNMENT LICENSE RIGHTS

This invention was made with government support under the SunShot Financial Assistance Award number DE-EE0006457 awarded by the Department of Energy. The government has certain rights in the invention.

BACKGROUND

Solar panels are widely used in the production of electricity with multiple panels typically connected together as panel assemblies. These solar panel assemblies are usually arranged in arrays and mounted on structural racking systems on the roofs of buildings, on the ground or other fixed structures. A fixed structure can include, but is not limited to, existing residential or commercial roof tops, horizontal surfaces or vertical surfaces, existing fences, railings, walls or open ground-mounted areas. In many jurisdictions, these mounting systems pass loading tests to ensure they can withstand static and dynamic loading anticipated during the life of the installation. These solar racking systems are often custom designed for each application and custom installed by contractors and tradespeople using specialty skills and following the approved drawings.

PV Solar modules typically are constructed using a lamination of a front sheet of glass, a layer of adhesive sealant, photovoltaic materials and conductors, another layer of adhesive and a sheet of specially designed polymer sheet, called the backsheet. These PV "glass-backsheet" modules are typically constructed with a frame to add rigidity to the "glass-backsheet" lamination and to provide a mounting point for the module.

In addition, a number of solar panel manufacturers have released new solar panels with integrated micro-inverters to simplify the electrical installation process. But a simple, low skill mechanical installation of a solar array remains unavailable on the market today.

Typical solar mounting or racking systems fail to provide the flexibility and ease of installation that many believe necessary for large scale adoption of solar power in the United States and around the world.

It is desired to have a solar module system that includes a flexible, configurable design that allows direct attachment either to the roof sheathing (plywood spanning over structural roof rafters or roof trusses that serves as a foundation for roofing materials) or to the roof rafters or roof trusses themselves. It is further desired to have a flexible, configurable solar module system that may be installed in a streamlined installation process which eliminates much if not all of the expense of custom design and installation activities. It is desired to have a solar module system that reduces work on the roof and reduces the skills and experience potentially necessary on the roof to perform a high quality solar array installation.

DETAILED DESCRIPTION OF THE EMBODIMENTS

Figure 1:
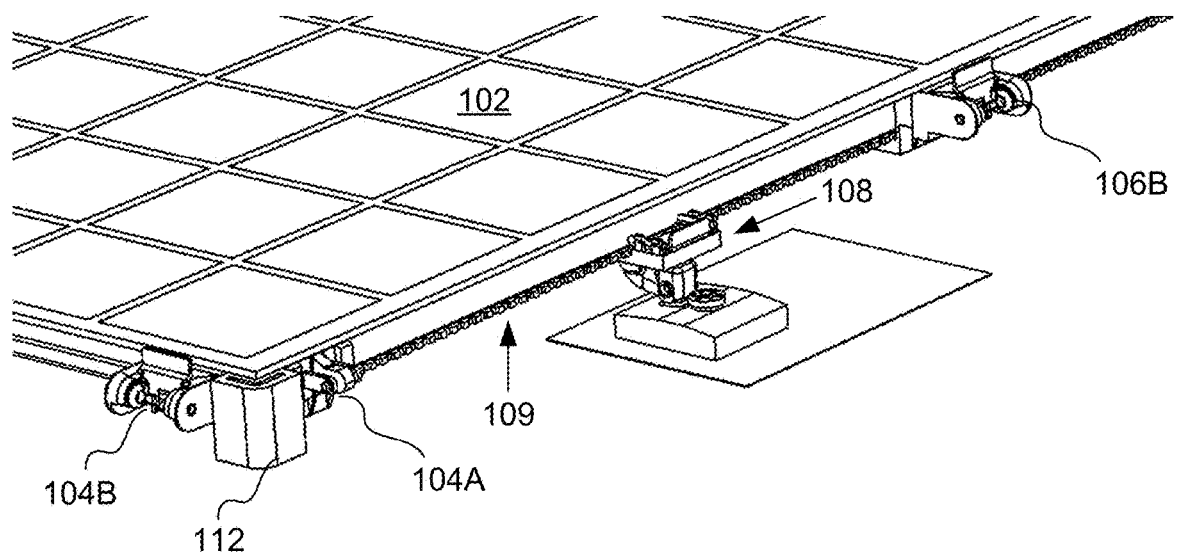
FIGS. 1-3 schematically illustrate partial top perspective views of example embodiments of a preassembled solar panel module including a mounting foot and snap connector components each coupled separately to one of multiple panel rails that are coupled to a backside surface of an otherwise frameless solar panel module.

A preassembled solar panel module includes a solar panel configured for receiving and converting solar radiation to produce electrical power. Multiple panel rails are coupled in preassembly to a backside surface of the solar panel, including at least two panel rails disposed a quarter length or halfway or three-quarters or more along a length of opposing longest sides of the solar panel. Multiple snap connector components are each coupled to one of the at least two rails and are each configured to couple with a complimentary snap connector component of an adjacent preassembled solar panel module or of a wind deflector accessory, or both. One or more mounting feet are each coupled at a selected location to one of the at least two panel rails and are each configured for coupling at a selected location to a roof or to other sunlight receiving surface.

An array of preassembled solar panel modules is provided that exhibits a height to gap ratio that is in a range between $0.42<H/G<15$. H is a height of a preassembled solar panel module measured as a spacing of said backside surface of said preassembled solar panel module from said roof or other sunlight receiving surface, and G is a gap spacing between nearest edges of adjacent preassembled solar panel modules.

Another array of preassembled solar panel modules is provided wherein $0.42<H/G<3$.

Another array of preassembled solar panel modules is provided wherein $0.42<H/G<1.5$.

An array of preassembled solar panel modules is provided in certain embodiments wherein $20\ mm<G<120\ mm$.

An array of preassembled solar panel modules is provided in certain embodiments wherein $50\ mm<H<300\ mm$.

An array of preassembled solar panel modules is provided in certain embodiments wherein $H<75\ mm$ and $G>37.5\ mm$.

An array of preassembled solar panel modules is provided in certain embodiments wherein $H/G\approx1$ An array of preassembled solar panel modules is provided in certain embodiments including one or more wind deflectors coupled to sides of preassembled solar panel modules that each define a peripheral segment of the array.

An array of preassembled solar panel modules is provided in certain embodiments including one or more short panel rails coupled to the backside surface of the preassembled solar panel module disposed a quarter length or halfway or three-quarters or more along a length of opposing shortest sides of the solar panel between at least two long panel rails that are disposed at opposing longest sides of the solar panel.

An array of preassembled solar panel modules is provided in certain embodiments including two or more short panel rails coupled to the backside surface of the preassembled solar panel module disposed a quarter length or halfway or three-quarters or more along short dimension segments spaced from either shortest edge of the solar panel between at least two long panel rails that are disposed at opposing longest sides of the solar panel.

An array of preassembled solar panel modules is provided in certain embodiments including bumpers at corners of the preassembled solar panel modules that extend normally from the backside surface further than any of the panel rails.

An array of preassembled solar panel modules is provided in certain embodiments, including at least two panel rails with outer facing walls having one or more features, e.g., notches, recesses, cutouts or protrusions, or combinations thereof, for coupling with complimentary features of mounting feet or of snap connector components, or both, for preventing movement along the panel rails of the mounting feet or of the snap connector components, or both.

An array of preassembled solar panel modules is provided in certain embodiments, wherein one or more mounting feet each include a slider and at least two panel rails each include a flange that does not overlap the slider in a direction normal to the preassembled solar panel module when the slider is in an open position, thereby permitting receipt of a flange end of a panel rail within a rail receiving recess defined within each of the mounting feet. The panel rail flange does overlap the slider in the direction normal to the preassembled solar panel module when the slider is slid to a closed position from the open position for securing a mounting foot to a panel rail. One or more snap connector components may include a slider for securing one or more snap connector components to one or more panel rails.

An array of preassembled solar panel modules is provided in certain embodiments, wherein one or more toggle anchors are provided each including a rotatably-attached, elongated washer for piercing roof sheathing or other sunlight receiving surface material in a first position and rotating to a second position for securing a mounting foot of a preassembled solar panel module of the array to the sunlight receiving surface after the piercing.

An array of preassembled solar panel modules is provided in certain embodiments, including one or more frameless solar panels. The one or more frameless solar panels may be strengthened by coupling two or more panel rails to a backside surface that are configured to stiffen the solar panel.

In certain embodiments, adjacent solar panel modules of an array are secured together by coupling together complimentary snap connector components that may be coupled one to each of two adjacent preassembled solar panel modules.

A frameless, preassembled solar panel module is also provided that includes a frameless solar panel configured for receiving and converting solar radiation to produce electrical power and multiple panel rails coupled in preassembly to a backside surface of the solar panel, including at least two panel rails disposed a quarter length or more along opposing longest edges of the solar panel. Multiple flexible snap connector components are each coupled in preassembly to one of the at least two rails and are each configured to for coupling with a complimentary snap connector component of an adjacent preassembled snap panel module or of a wind deflector accessory, or both. One or more mounting feet are each coupled in preassembly at a selected location to one of the at least two panel rails and each mounting foot is configured for coupling at a selected location to a roof or to another sunlight receiving surface. In certain embodiments, one or more wind deflectors are coupled to one or more sides of the frameless, preassembled solar panel module. These one or more sides are selected in preassembly for coupling wind deflectors thereto for defining a peripheral segment of an array of multiple modules.

A frameless, preassembled solar panel module may include one or more short panel rails coupled to the backside surface of the preassembled solar panel module disposed a quarter length along opposing shortest sides of the solar panel between at least two long panel rails that are disposed at opposing longest sides.

A frameless, preassembled solar panel module may include two or more short panel rails coupled to the backside surface of the preassembled solar panel module disposed a quarter length or more along short dimension segments spaced from either shortest side of the solar panel between at least two long panel rails that are disposed at opposing longest sides.

A frameless, preassembled solar panel module may include in certain embodiments a bumper at each corner of the frameless, preassembled solar panel module that extends normally from the backside surface further than any of the panel rails.

A frameless, preassembled solar panel module may include in certain embodiments at least two panel rails that include outer facing walls with one or more features, e.g., a series of notches, recesses, cutouts or protrusions, or combinations thereof, for coupling with complimentary notches of mounting feet or of snap connector components, or both, for preventing movement along a panel rail of a mounting foot or of a snap connector component, or both.

A frameless, preassembled solar panel module may include in certain embodiments a mounting foot that includes a slider and at least two panel rails coupled to a backside surface that each include a flange that does not overlap the slider in a direction normal to the preassembled solar panel module when the slider is in an open position, thereby permitting receipt of a flange end of a panel rail within a rail receiving recess defined within the mounting foot assembly. The panel rail flange does overlap the slider in a direction normal to the preassembled solar panel module when the slider is slid to a closed position from an open position for securing a mounting foot to a flanged panel rail. One or more snap connector components may include a slider for securely coupling to a flanged panel rail.

A frameless, preassembled solar panel module may include mounting feet in certain embodiments that are configured to be coupled to a sunlight receiving surface using one or more toggle anchors that include a rotatably-attached, elongated washer for piercing roof sheathing or other sunlight receiving surface material in a first position and rotating to a second position securing the mounting foot to the surface material after the piercing. The frameless, preassembled solar panel module may be strengthened by the panel rails being configured to stiffen the solar panel. The frameless, preassembled solar panel module may be configured for coupling with one or more adjacent frameless, preassembled solar panel modules by coupling together complimentary snap connector components that are coupled one to each of two adjacent preassembled solar panel modules.

A frameless, preassembled solar panel module may include one or more snap connector components configured to provide relative alignment with adjacent modules of an array by the coupling together of complimentary snap connector components coupled one to each of the adjacent preassembled solar panel modules.

A frameless, preassembled solar panel module may include one or more snap connector components that include a locking mechanism to secure the coupling with a snap connector component of an adjacent preassembled solar panel module.

A frameless, preassembled solar panel module may include one or more mounting feet that include one or more pivoting features configured to provide relative movement between a pair of components to prevent or reduce strain or stress.

A frameless, preassembled solar panel module may include one or more mounting feet that include one or more pivoting features configured to provide relative movement of a preassembled solar panel module to prevent or reduce stress or strain from wind or snow loading or other factors by flexing about the one or more pivoting features.

A frameless, preassembled solar panel module may include two or more overlapping surfaces that are each configured to receive and convert solar radiation to generate electrical power.

In certain embodiments, the frame of a conventional solar panel is replaced on a glass-backsheet solar photovoltaic (PV) module by a set of long panel rails coupled to the bottom or backside of the module along the long edges of the module. A set of one or more short rails may be coupled along one or more short edges of the modules and/or spaced significantly from the short edges for example even at mid-rail locations between the long rails or for example a pair of short rails may be disposed ⅓ of the length of the long rails from the ends of the long rails. The rails may be configured to provide rigidity to glass-backsheet lamination in certain embodiments.

The rails may also be configured for providing a base for side snap brackets to couple to the solar PV module and/or for providing a base for corner snap brackets to couple to the module. The rails may also be configured for providing a base for mounting feet to couple to the solar PV module for securing the module to a roof or other sunlight receiving surface. The rails may also be configured to provide a structure for securing power electronics, cables and/or wires.

The coupling of a mounting foot to a panel rail can be performed in a number of ways including inserting pins from the foot into holes or slots in the rail (see, e.g., FIGS. 1-3, 5, 6F-6J, 22B, 29D-29H). In addition to the method described to support the glass-backsheet PV module, another embodiment is provided that includes a panel rail system coupled to the bottom or backside of a solar PV module. In this embodiment, rails are coupled to the bottom or backside of the module at the long sides of the modules that are employed to provide utility for dual glass PV modules, which are modules constructed with a second sheet of transparent or translucent glass, while a solar PV module may also include a single top or frontside sheet of glass and an opaque polymer backsheet. In the dual-glass embodiment, the dual glass long rails are coupled to the glass backsheet, and may also be coupled to side snaps, long snaps, bumpers, mounting feet, power electronics or clips for holding cables or wires conducting electricity produced by the PV module, or combinations thereof.

In certain embodiments, polymer materials are employed for snaps, bumpers, brackets, mounting feet, or rail coatings, or combinations thereof, that allow the safe installation, use and operation of the pre-assembled solar panel modules without needing any equipment grounding or bonding alternative metal parts contained within the system.

Furthermore, the back coupling of the rails to the solar module serves in certain embodiments to prevent premature degradation of the solar module, which could otherwise reduce a module's power production over time, primarily but not exclusively due to the elimination of potential induced degradation, which is a condition that has afflicted many conventional framed, glass-backsheet modules.

PREASSEMBLED

FIGS. 1-5, 16A-28B and 30-31D illustrate several embodiments of fully or partially preassembled and/or installed solar panel modules. A fully preassembled solar panel module in accordance with certain embodiments includes two or more panel rails coupled to a backside surface, and two or more snap connector components and one or more mounting feet each coupled to at least one of the panel rails. Multiple solar panel modules of an array are secured to a roof or other sunlight receiving surface by coupling the one or more mounting feet to the roof or other sunlight receiving surface and by coupling together adjacent snap connector component pairs of adjacent solar panel modules. A partially preassembled solar panel module may be shipped before coupling the one or more mounting feet, which may be coupled at selected locations along the rails that are determined onsite based on locations of bands of sheathing strength and/or on specific details relating to the roof or other sunlight receiving surface upon which the solar array is being installed.

The mounting feet are designed in certain embodiments to be coupled to preassembled solar panel modules before anchoring the feet and the modules of the array to a roof or other sunlight receiving surface. A fully preassembled solar panel module includes the one or more mounting feet coupled thereto at least by the time of anchoring to the roof. During shipping, the mounting feet may or may not be coupled to a partially preassembled solar panel module.

A partially preassembled solar panel module may include two or more panel rails coupled to a backside surface. The solar panel module may be deemed to be fully preassembled when the one or more mounting feet are each coupled to one of the backside-attached panel rails. A fully or partially preassembled solar panel module may include one or more bumpers, one or more brackets, e.g., that may couple to ends of one or more panels rails or may include built-in snap connector components, and/or one or more snap connector components along one or more sides and/or at one or more of the corners for coupling together adjacent modules of a solar array. Particular configurations of side snap connectors and/or corner snap connectors may be customized specific to installation applications, e.g., residential pitched roof solar arrays may include snap-connected adjacent solar panel modules or solar farm arrays or multi-directional arrays that may include some adjacent solar panel modules that are snap-connected together and some that are not, and an array may include no snap connected adjacent solar modules in certain applications.

For residential pitch roof applications, snap connector components are included with preassembled solar panel modules in accordance with several example embodiments. For other applications, like low slope commercial or residential roof, preassembled solar panel modules may include fewer preassembled components. In such low slope applications, for example, either the side snaps, the corner snaps or the bumpers or combinations thereof may be excluded from a preassembled solar panel module in certain embodiments.

As another example, for an installation in which a customer prefers not to see brackets or snap-connector components along a perimeter edge of a solar array, the brackets or the side snaps or the corner snaps or the bumpers or combinations thereof may be optionally removed to provide a clean frameless aesthetic and an edge free from components which can catch debris or be used by insects for nesting. Wind deflectors may be provided that also serve aesthetically to block certain components from view and from damaging effects from wind or rain or other natural factors.

In some applications, like low slope commercial or residential roof, fewer than all installed components may be coupled in preassembly to the solar panel module. In a low slope application, for example, either the side snaps, the corner snaps or one or more bumpers or wind deflectors, or combinations thereof, may be excluded from a preassembled solar panel module or optionally included even module-to-module depending on the arrangement and particulars of the array and the installation surface. Any one or more of these components may be installed in a subsequent assembly step before transport to an install site or at an install site prior to mounting to a roof or other sunlight receiving surface, or even after mounting, or may be subsequently removed, or may left off one or more modules or from an entire array of preassembled solar panel modules.

A long panel rail, i.e., a panel rail that is aligned with a longest side of a solar panel, may be as long as the longest side of the solar panel, or may be much smaller, e.g., a quarter, a half or three-quarters of the length of the long side of the solar panel. When shorter panel rails are used, there may be more than one of them disposed coaxially or non-coaxially, and spaced-apart along the long side of the solar panel. For example, there may be two panels rails coupled along each long side of a preassembled solar panel module, one for coupling with a mounting foot and the other for coupling with a snap coupler component. In another example, three panel rails, each being one quarter of the length of the longest side of a solar panel module, are disposed coaxially along the longest side of a preassembled solar panel module and spaced apart by an eighth of the length of the longest side of the module.

The panels rails in a dual glass, frameless solar panel module configuration may provide some stiffening support to the module, although dual glass module already has two plane glass stiffness. In a glass-polymer backsheet module, that may or may not include a frame, the panel rails would be configured to provide enhanced stiffness in both the short and long sides of the module.

BRACKETS

In certain embodiments, one or more mounting feet, one or more panel rails, one or more snap connectors, one or more wind deflectors and/or one or more accessory components may be coupled to one or more brackets that are coupled to a backside of a preassembled solar panel module, and brackets of adjacent modules of an array may be coupled together. In certain embodiments, all of these components are coupled to underside brackets, while in other embodiments, these brackets have a more limited use, e.g., coupling just to brackets of adjacent modules or for coupling long and short panel rails together, while other embodiments include no brackets. The function of the brackets in certain embodiments may be served by one or more panel rails, e.g., for coupling with mounting feet or a mounting foot or mounting foot component may be built-in integrally with a bracket or panel rail or with the preassembled solar panel module itself.

In certain embodiments, mounting feet may couple with a track or panel rail or bracket or an aluminum extrusion running along a backside or bottom edge of a frameless PV module. In certain embodiments, brackets are coupled at backside corners of a preassembled solar panel module for coupling with one or more panel rails and/or snap connectors, while in other embodiments, snap connectors are integral with the brackets. In other embodiments brackets and snap connector components are one and the same component that may couple to a panel rail or directly to an underside or backside surface of a preassembled solar panel module. Corner brackets may be integral with or coupled to corner bumpers that protect the underside of the preassembled solar panel module during shipping, stacking, storage and/or installation. Snap connectors at the corners may be coupled to ends of long rails and/or to ends of short rails or directly to the solar panel, or combinations of these. The panel rails, brackets and/or snap connector components may be coupled to the backside of a preassembled solar panel module using adhesive. In certain embodiments, none of the panel rails, brackets and/or snap connectors is coupled to any edge of the preassembled solar panel module, which may or may not include a frame, and which may have a dual-glass (front and back) design or a single glass (front),-polymer (backside) design.

Transparency is needed for the frontside of the module in order that solar radiation may directly reach the optoelectronic components of the photovoltaic module, while transparency is optional for the backside surface, which may be alternatively opaque, translucent or even reflective. In certain embodiments, alternative optical paths may be employed for directing solar radiation to impinge upon these or other subsets of optoelectronic components such as by using mirrors or lenses for collecting and/or focusing and/or redirecting the solar radiation. For example, a mirror may be provided to redirect solar radiation to impinge upon the optoelectronic components from the backside, and more than one photovoltaic layer may be stacked within a single preassembled solar panel module for increased efficiency.

Brackets and/or snap connectors may be coupled directly to the solar panel or to long or short rails, or combinations thereof. Side snap connector components may be coupled to a panel rail using a bolted mechanism or a slide-flange mechanism in certain embodiments. Corner snap connectors may be coupled to ends of panel rails or to the underside surface of the preassembled solar panel module, or combinations thereof. Corner bumpers, corner brackets and corner snaps may be combined into a single integral component in certain embodiments, which may couple to a panel rail or may be integrally-formed with a panel rail. In certain embodiments, corner bumpers and corner snaps may be combined into a single integral corner bracket component, which may also couple to short and/or long rail ends and/or to the underside surface of a preassembled solar panel module in accordance with certain embodiments. Any of these corner bracket embodiments may couple long and short rails together end to end, or end to mid-rail location.

In certain embodiments, corner brackets may serve to couple long rails to short rails as well as to couple adjacent preassembled solar panel modules together, and to protect the underside of the preassembled module as a bumper to absorb collisions and prevent contact damage to the module. In certain embodiments, corner snaps are coupled at all four underside corners of a preassembled solar panel module, and side snaps are coupled mid-rail to each long rail and aligned with and/or coupled to one or more short rails. These side snaps may be configured to serve as a bracket for coupling panel rails to the backside of the module, or to other rails or other components in certain embodiments, while panel rails may be adhesively coupled to the backside surface of a preassembled solar panel module. In certain embodiments, one or more side snaps may couple to both a long rail and a short rail.

Certain embodiments include fewer side snaps or no side snaps, while corner snap brackets are also optional, particularly in embodiments configured as a minimalist installation, e.g., for modules of an array that are disposed along the perimeter of a solar array or in the case of alternative roofing systems in which these components are not used.

SNAP CONNECTORS

In some embodiments, snap connectors or snaps may be provided at the corners, while snap connectors or snaps that are not at the corners may be coupled to the long rails anywhere along the length of the rail. The snap connectors may be configured as a sleeve disposed around a length of a panel rail, or the snap connectors may couple to the rails using a slider to catch a panel rail flange or using a bolt and nut mechanism or peg and slot mechanism in certain embodiments.

In certain embodiments, snap connectors may be coupled to rail connectors that connect long rails to short rails on one side (facing in away from the edge of the module) and that connect long rails to snap connectors on the other side (facing out towards the edge of the module). Snap connectors or snaps can serve multiple purposes, including creating a module to module coupling location, coupling to a long panel rail, coupling to a short panel rail, or efficiently transferring mechanical load from module to snap to foot, or combinations thereof. Snap connectors in certain embodiments offer a rotational lock of the snap coupling mechanism which improves the usability and the effectiveness of the snap locking operation by installers.

Figure 31A:
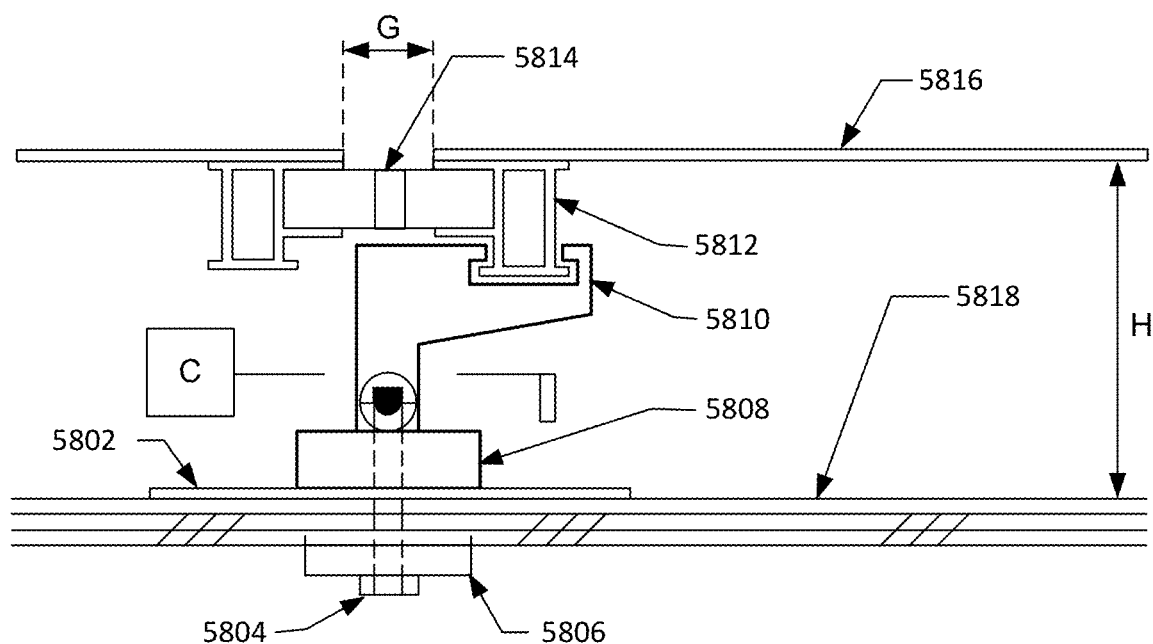
FIG. 31A schematically illustrates a partial side view of adjacent solar panel modules, each including a track coupled with complementary snap connectors and a mounting foot that is coupled to a roof or other sunlight receiving surface using a sheathing toggle anchor in accordance with certain embodiments.
Figure 31B:
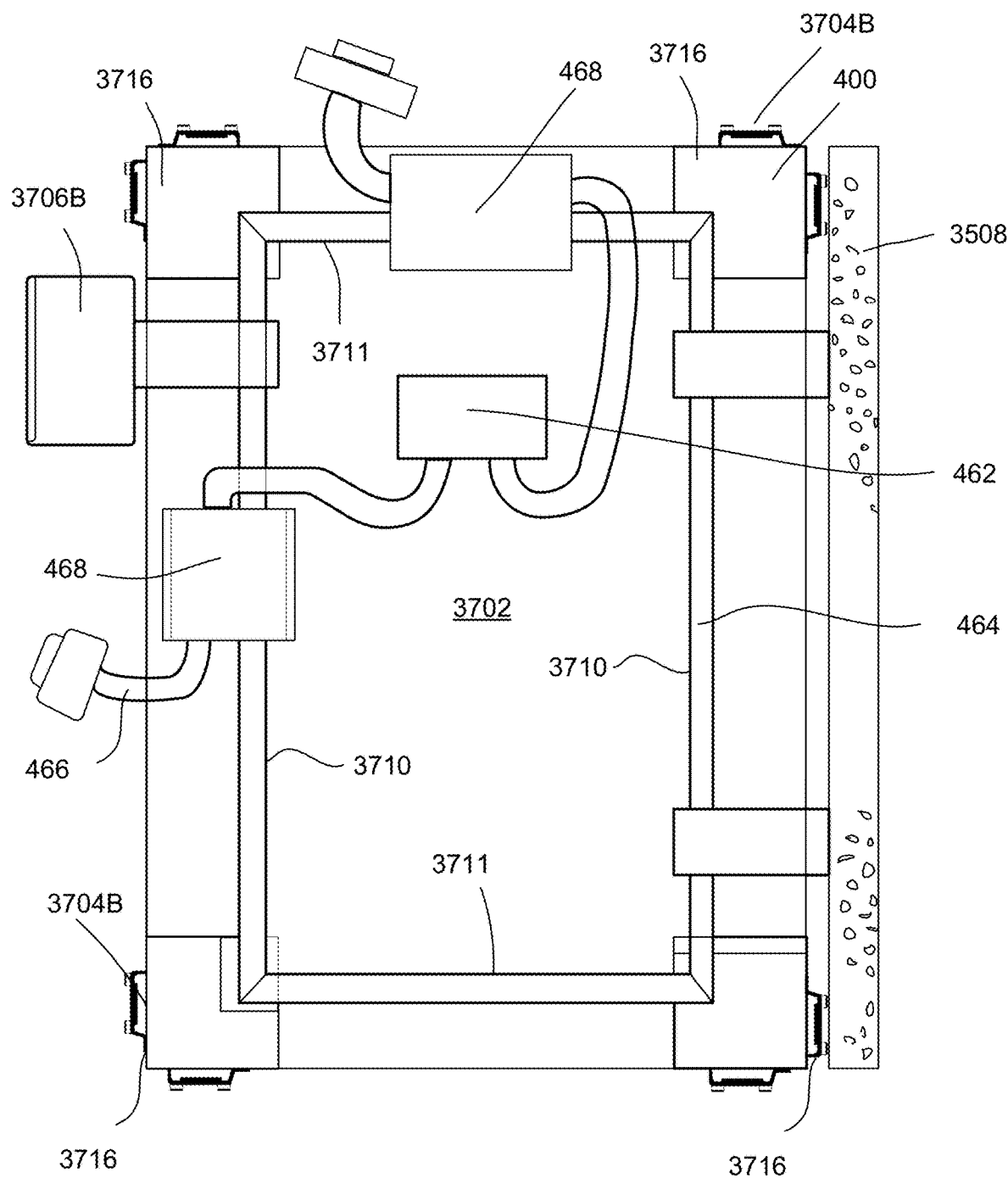
FIG. 31B illustrates a backside view of a perimeter solar panel module including an interlocking mounting system for coupling adjacent solar panels and a wind deflector in accordance with certain embodiments.
Figure 31C:
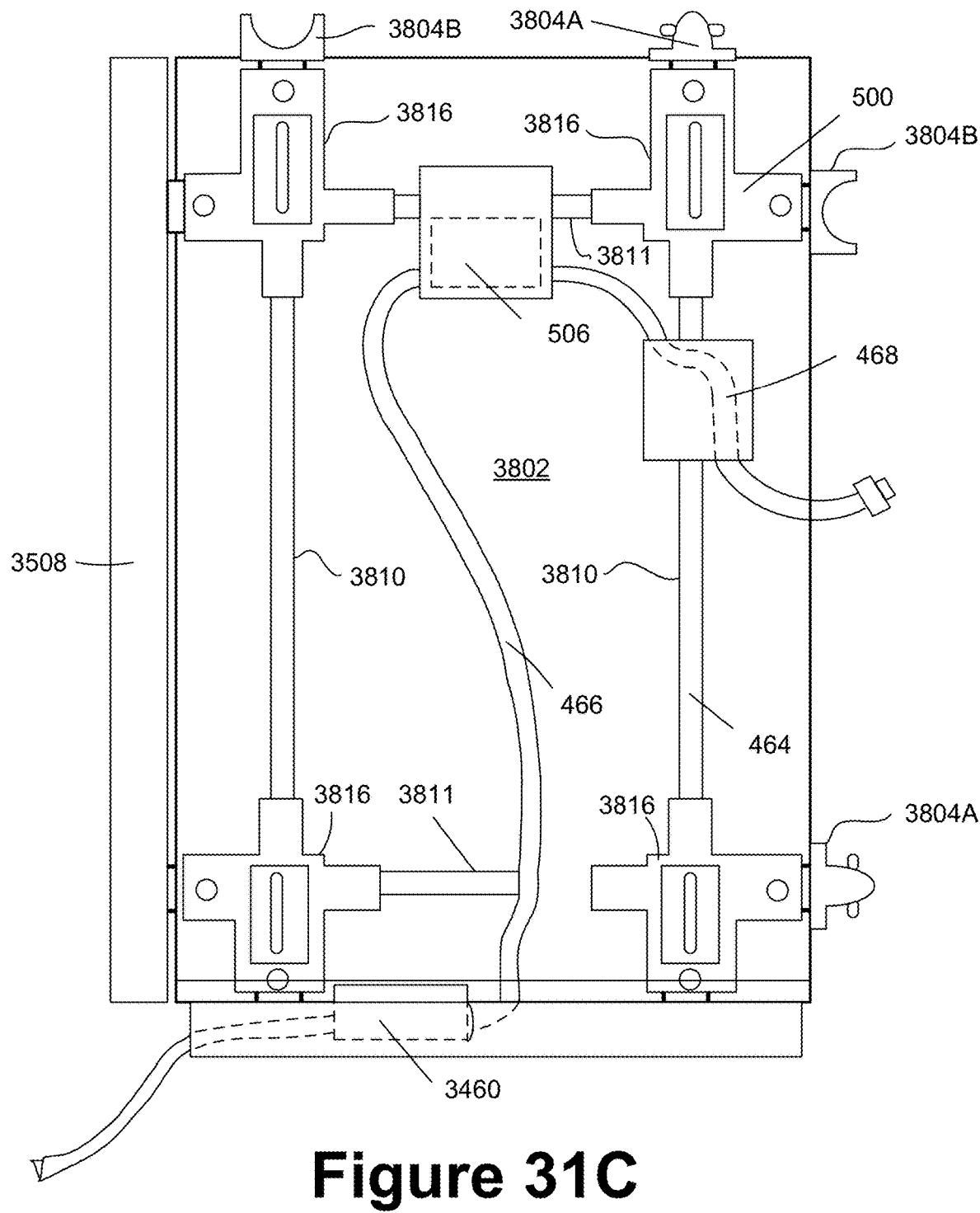
FIG. 31C illustrates a backside view of a corner solar panel module including an interlocking mounting system for coupling adjacent solar panels with configurable mounting brackets and a pair of wind deflectors in accordance with certain embodiments.
Figure 31D:
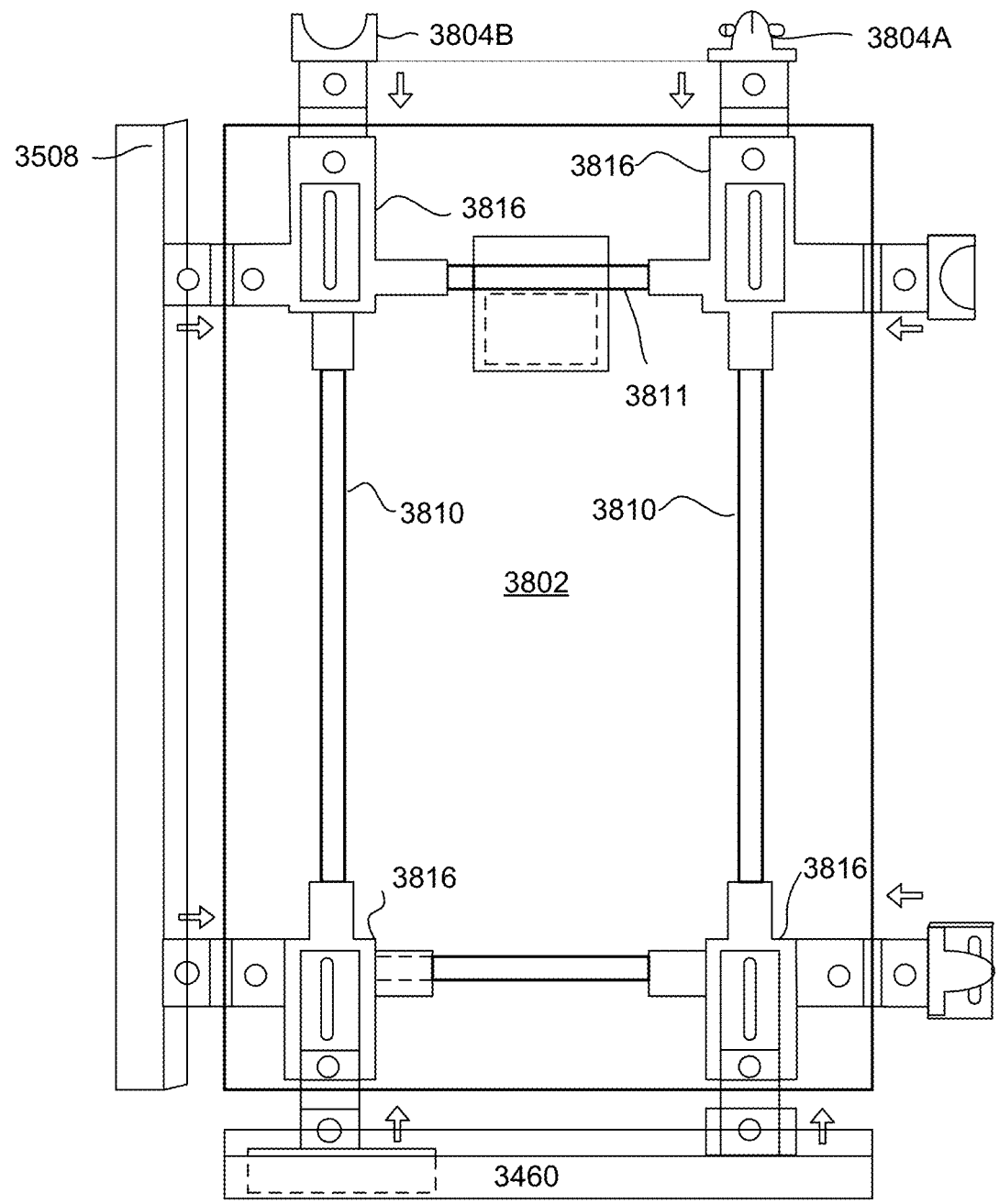
FIG. 31D illustrates the solar panel module of FIG. 31C which couples with the pair of wind deflectors using same or similar snap connectors as are used for coupling adjacent solar panel modules in accordance with certain embodiments.

In certain embodiments, mounting feet couple to brackets, e.g., as in FIGS. 31C-31D, and the brackets are coupled to the backside of the solar panel. In other embodiments, mounting feet don't couple to brackets but to panel rails, e.g., as in FIGS. 1-5, 16C-16D, 21, 28D and 31A. The panel rails are disposed close to the edges in certain embodiments so that mounting feet can be non-overlapping of the solar panel at a roof or other sunlight receiving surface location where snap toggle mounting is performed. Mounting feet can be easily adjusted to another location along a rail, e.g., that overlaps a sheathing strong point or band of sheathing strength, in preassembly or on location. Snaps, snap connectors or snap couplers can be easily adjusted to any location along a panel rail to align with complimentary snaps, snap connectors or snap couplers on an adjacent preassembled solar panel module.

Figure 2:
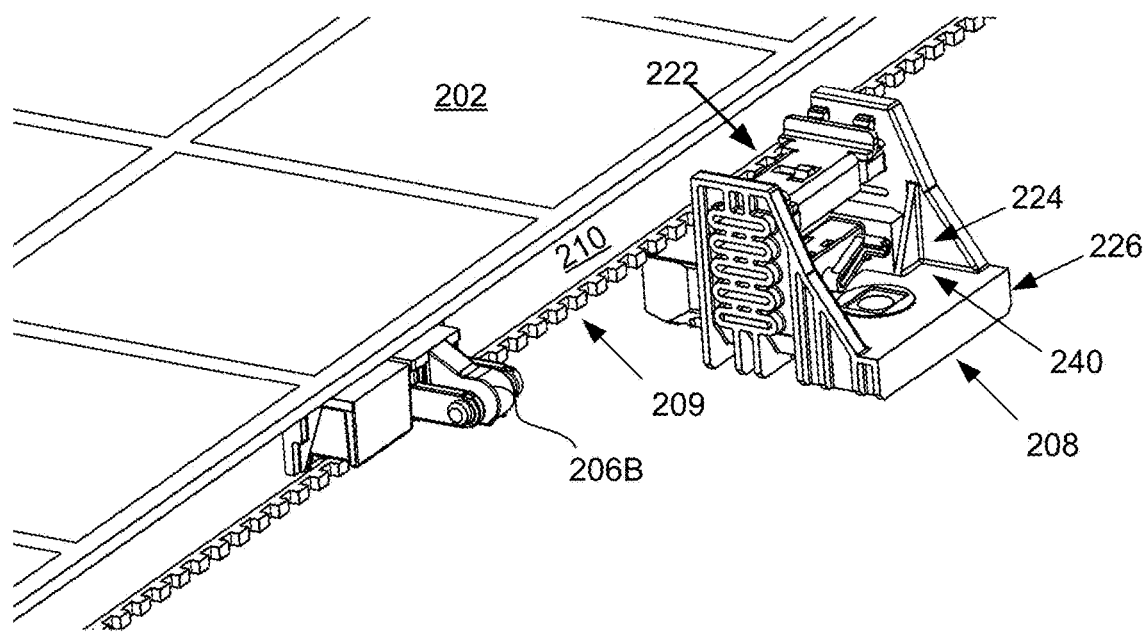
Figure 3:
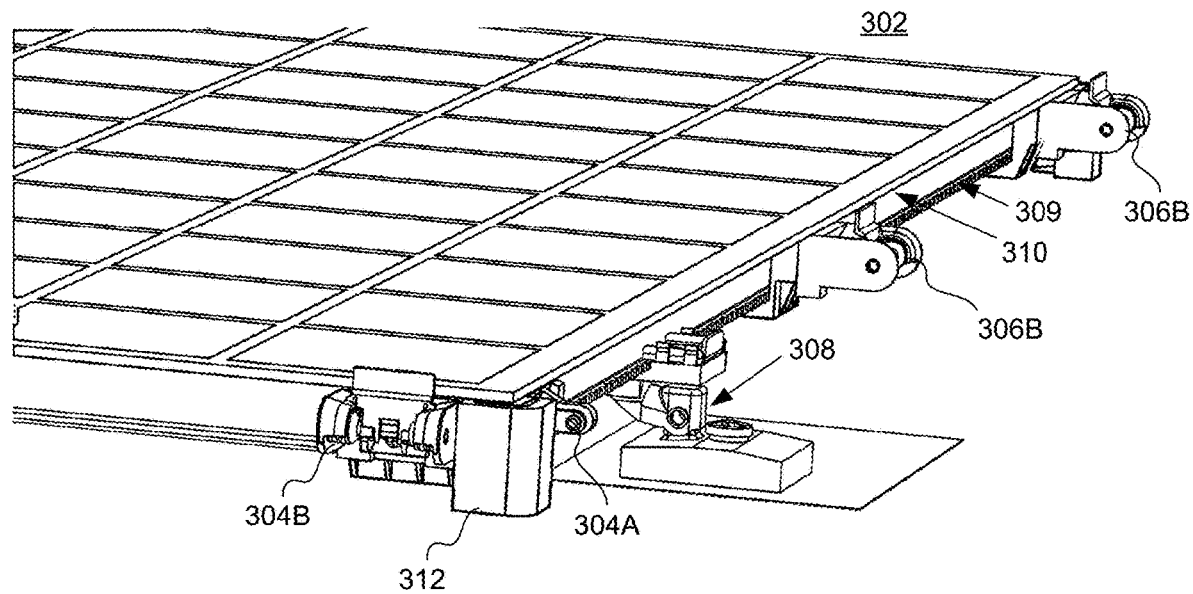

FIGS. 1-3 schematically illustrate partial top perspective views of example embodiments of a preassembled solar panel module including a mounting foot and snap connector components each coupled separately to one of multiple panel rails that are coupled to a backside surface of an otherwise frameless solar panel module. The backside coupled rails allow the secure mounting of frameless solar panel modules to rigid structures without the need of a frame. Replacing a traditional solar panel module frame with rails as shown lowers cost and improves reliability of the module by removing the risk of increased module degradation due to the voltage difference between the modules and the frame, called potential induced degradation or PID.

FIG. 1 schematically illustrates a preassembled solar panel module 102 in accordance with certain embodiments that includes complimentary, e.g., male and female, corner snap couplers 104A, 104B, a side snap coupler 106B, which is configured to couple with a complimentary side snap coupler of an adjacent preassembled solar panel module in an array, a corner bumper 112 and a mounting foot 108 that is shown engaging with a panel rail with notches 109 configured for interlocking with complimentary features on the mounting foot 108.

FIG. 2 illustrates a preassembled solar panel module 202 including a side snap connector component 106A coupled to a panel rail 210 that has a series of notches 209 for coupling with a mounting foot 208 that includes a rail clip 222, a height adjustment mechanism 224, a pivot adjustment handle or lever 240, and a foot base 226 in accordance with certain embodiments.

FIG. 3 illustrates a preassembled solar panel module 302 including corner snap couplers 304A, 304B, and a corner bumper 312, as well as side snap couplers 306B that are coupled to a panel rail 310 that has a series of notches 309 for interlocking with a complimentary series of features of the snap coupler 306B and for coupling with and interlocking with complimentary features of a mounting foot 308 in accordance with certain embodiments.

Figure 4:
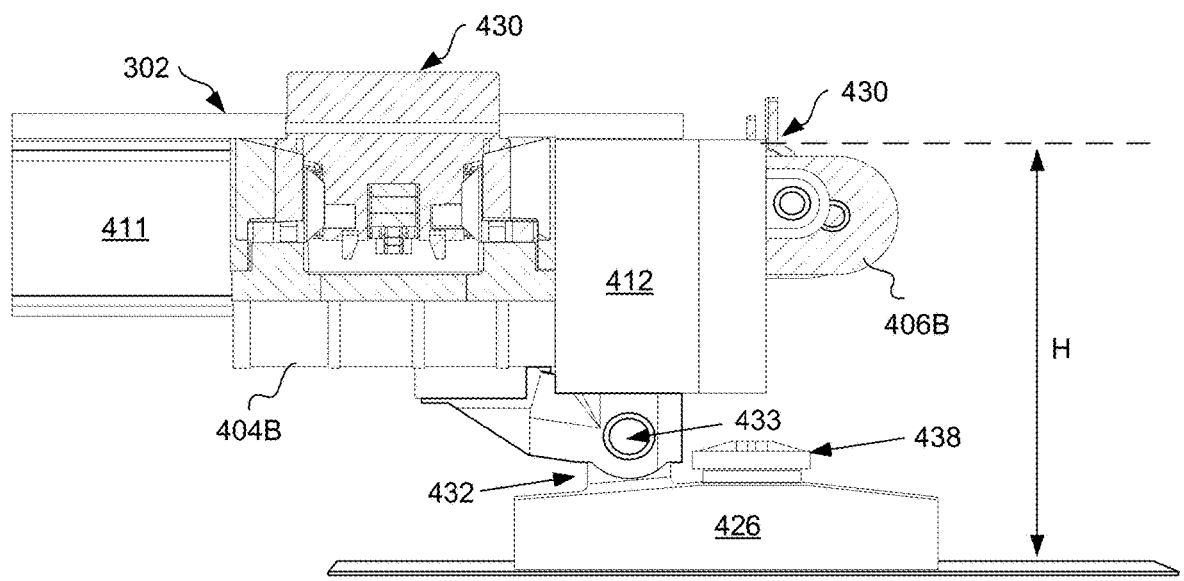
FIG. 4 schematically illustrates a side view of the solar panel module of FIGS. 1-3.

FIG. 4 schematically illustrates a side view of the solar panel module of FIGS. 1-3. In FIG. 4, we see the Female corner snap 404B with a rotating lock 430 and a corner bumper 412. This FIG. 4 shows the height H of the system or the dimension between the roof or other fixed surface and the back side of the preassembled solar panel module 402. This low profile design is valuable as it lowers the effective wind loading on the preassembled solar module array and by extension all its components which saves weight and cost.

FIG. 4 schematically illustrates a side view of one corner of the module 302 of FIG. 3 including a corner snap coupler 404B, a corner bumper 412, a short side panel rail 411. FIG. 4 also shows a foot arm 432 coupled to a foot base 426 via a pivot 433. A foot cap 438 provides a weather-resistant seal over the toggle anchor hole in the roof or other sunlight receiving surface to which the module 302 is mounted.

Figure 5:
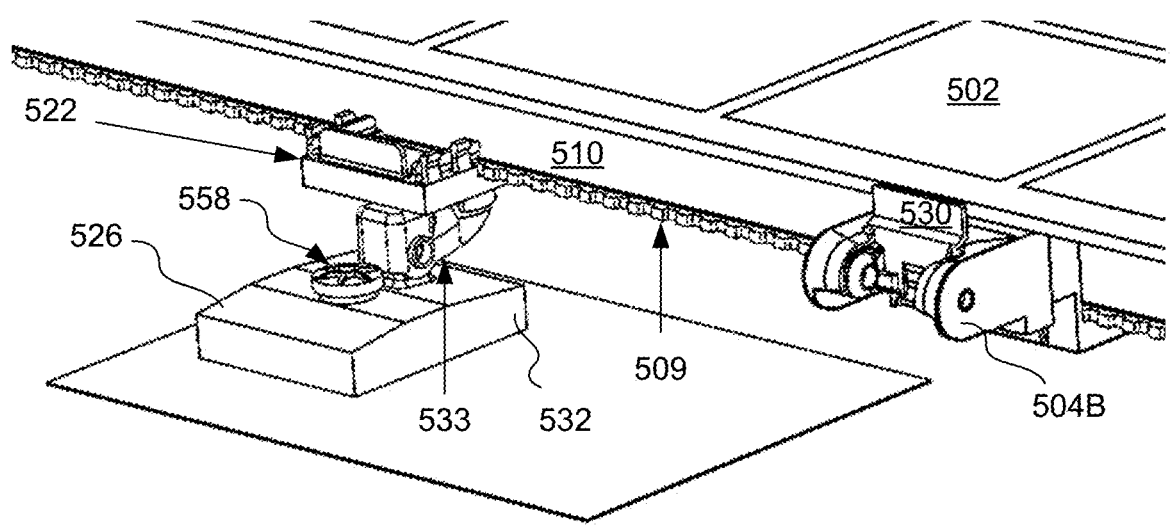
FIG. 5 schematically illustrates a partial top perspective view of a preassembled solar panel module including a mounting foot and snap connector components coupled separately to a notched rail that is attached along one edge of the backside of an otherwise frameless preassembled solar panel module in accordance with certain embodiments.

FIG. 5 schematically illustrates a partial top perspective view of a preassembled solar panel module 502 including a mounting foot 508 and a snap connector component 506B coupled separately to a notched rail 509, 510 that is attached along one edge of the backside of an otherwise frameless preassembled solar panel module 502 in accordance with certain embodiments. In FIG. 5, the mounting foot 508 that includes a foot base 526, a pivot 533, a foot cap 538 and a foot arm 532, as well as a foot rail clip 522 that is configured either to slide or rotate between open and closed positions for receiving and securing a panel rail 510. Mounting feet and/or snap couplers can couple to rails at any of several locations along the rails. FIGS. 6A-15 schematically illustrate several example embodiments of mounting feet that are configured for coupling to a panel rail and to a sunlight receiving surface using a snap toggle in order to couple a preassembled solar panel module to a rooftop or other sunlight receiving surface. Preassembled solar panel modules in accordance with certain embodiments are advantageously configured to be stabilized within an installed solar array by both mounting to a roof or other sunlight receiving surface by mounting feet coupled to backside panel rails and mounting to adjacent solar panels by coupling together complimentary snap coupling components on adjacent modules.

FIG. 6A-6J schematically illustrate in multiple perspective and side views example embodiments of mounting feet 608A-J including example mounting feet having defined therein a rail-receiving recess 634A-J including a notched edge 636A-J configured to compliment a notched rail 509, 510 as in the example of FIG. 5, and including example mounting feet that include a slide-lock mechanism 622A-J that permits a length of the notched rail 509, 510 to be received within the recess 634A-J in a first position and that is slidable to a second position to secure the rail 510 within the recess 634A-J, and that is slidable back to the first position to permit the rail to be decoupled from the recess, e.g., to adjust the position of the mounting foot 608A-J relative to the rail or to replace the mounting foot or the entire solar panel module to which the mounting foot is coupled, in accordance with certain embodiments.

In certain embodiments, the moving slide-lock mechanism 622A-J may include a rail clip similar to foot rail clip 530 of FIG. 5 which fastens the rail 510 with notches 509 against the fixed rail clip base 623A-J. The rail clip base 623A-J is coupled to the foot arm 632A-J via a pivoting feature 642A-J. The foot arm 632A-J is adjustably attached to the foot base 623A-J via the foot base pivot 633A-J which in certain embodiments employs a pinned connection to significantly reduce the stress or strain imposed on the mounting feet 608A-J in service when, for example, wind and snow loads may be present. The foot cap 638A serves as a waterproofing cap over the hole which is used to mount the Foot base 626A to the roof or other fixed structure to which the solar module is mounted.

When the preassembled solar panel module is loaded by wind or snow loading, the preassembled solar panel module may deflect and the edges of the module may rotate or move slightly up or down depending on the loading conditions. When the preassembled solar panel module deflects in such a manner, the mounting feet 608A-J in these embodiments with arm 632A-J coupled adjustably via a pivot 633A-J to a foot base 626A-J is advantageously configured to resist considerable stress and strain. When the pivoting feature 633A-J is employed in the embodiments shown, they serve to reduce stress and strain on the mounting feet 608A-J and to increase their reliability and mechanical and structural capacity.

Figure 6A:
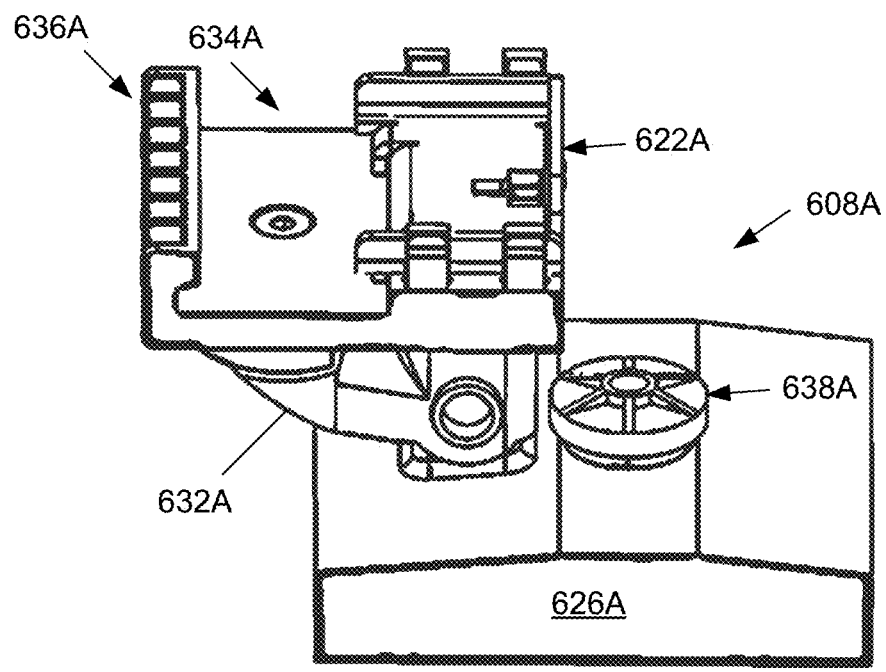
FIG. 6A-6J schematically illustrate in multiple perspective and side views example embodiments of mounting feet including example mounting feet having defined therein a rail-receiving recess including a notched edge configured to compliment a notched rail as in the example of FIG. 5, and including example mounting feet that include a slide-lock mechanism that permits a length of the notched rail to be received within the recess in a first position and that is slidable to a second position to secure the rail within the recess, and that is slidable back to the first position to permit the rail to be decoupled from the recess, e.g., to adjust the position of the mounting foot relative to the rail or to replace the mounting foot or the entire solar panel module to which the mounting foot is coupled, in accordance with certain embodiments.
Figure 6B:
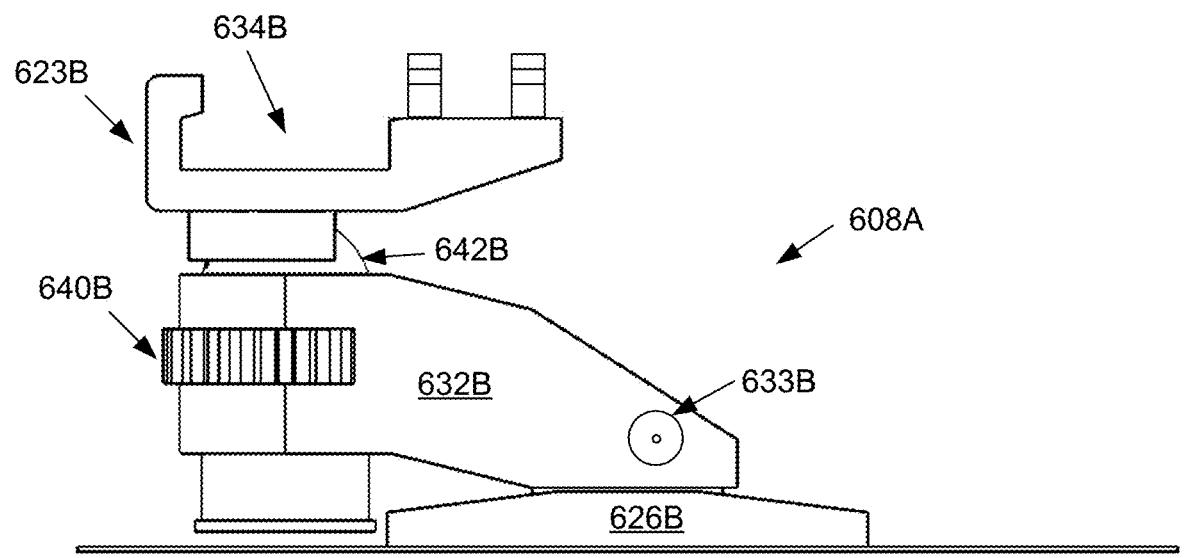

In FIG. 6B, a separate embodiment of a pivoting foot 608B with the addition of a foot adjuster 640B for manually adjusting the doubly pivotable mounting foot 608B of FIG. 6B. FIG. 6B illustrates a mounting foot 608B that includes a first pivot 633B between the foot base 626B and the foot arm 632B and a second pivot 642B between the foot arm 632B and the rail clip base 623B, each employing different bolted mechanisms in certain example embodiments. A rail-receiving recess 634B defined in the rail clip base 623B.

Figure 6C:
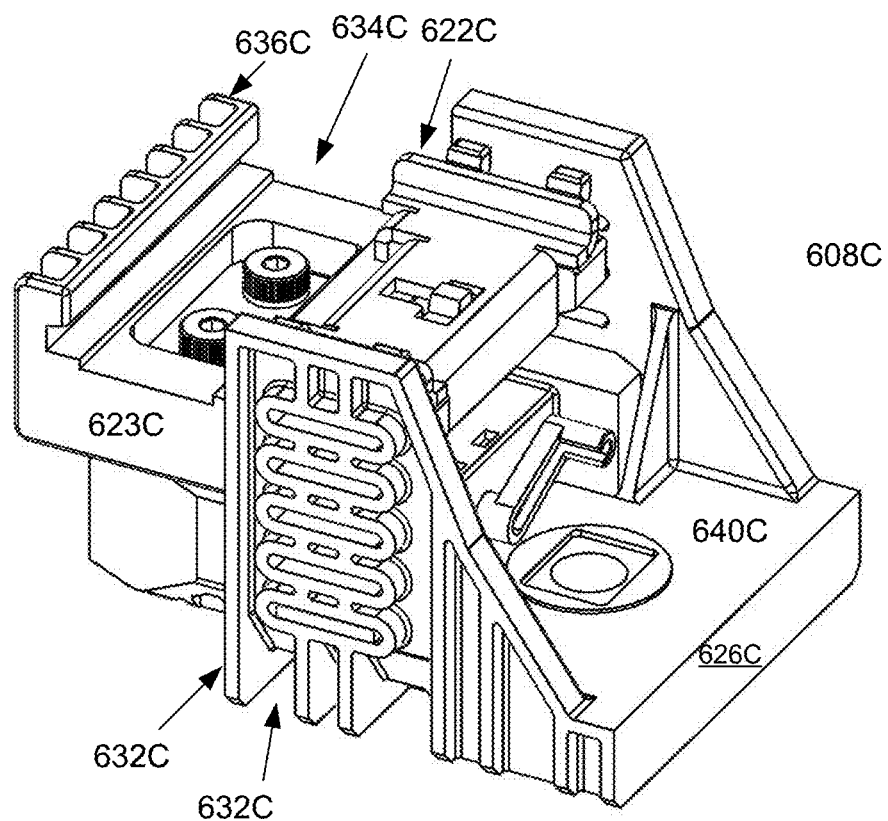
Figure 6D:
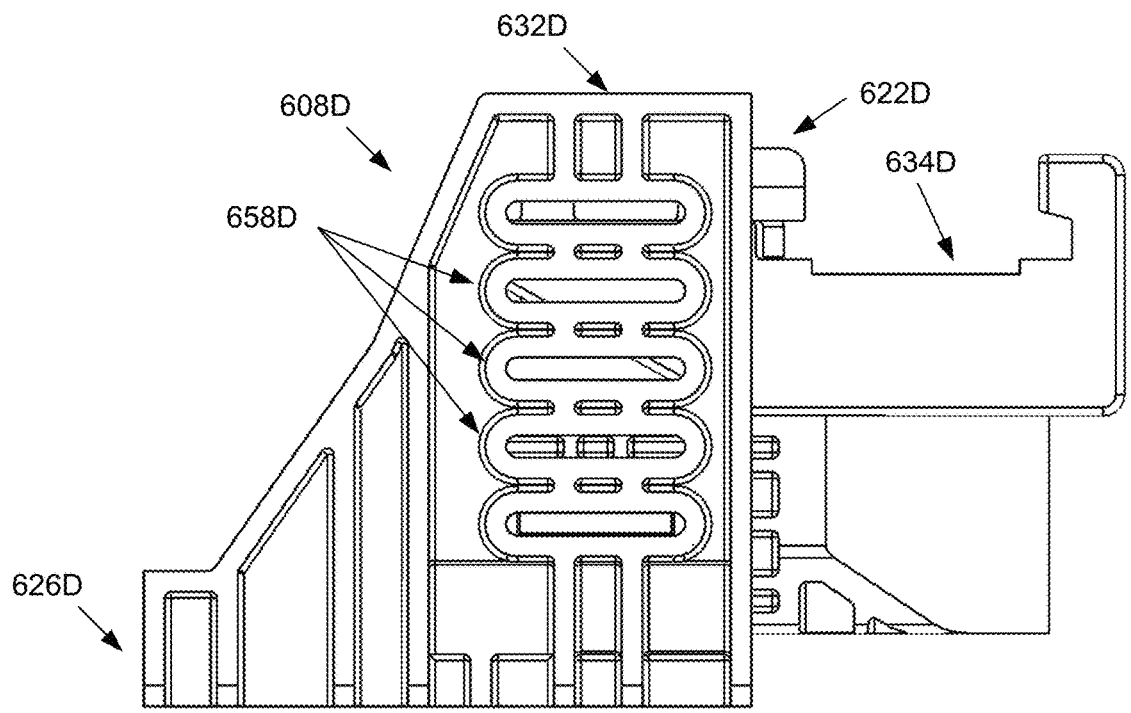
Figure 6E:
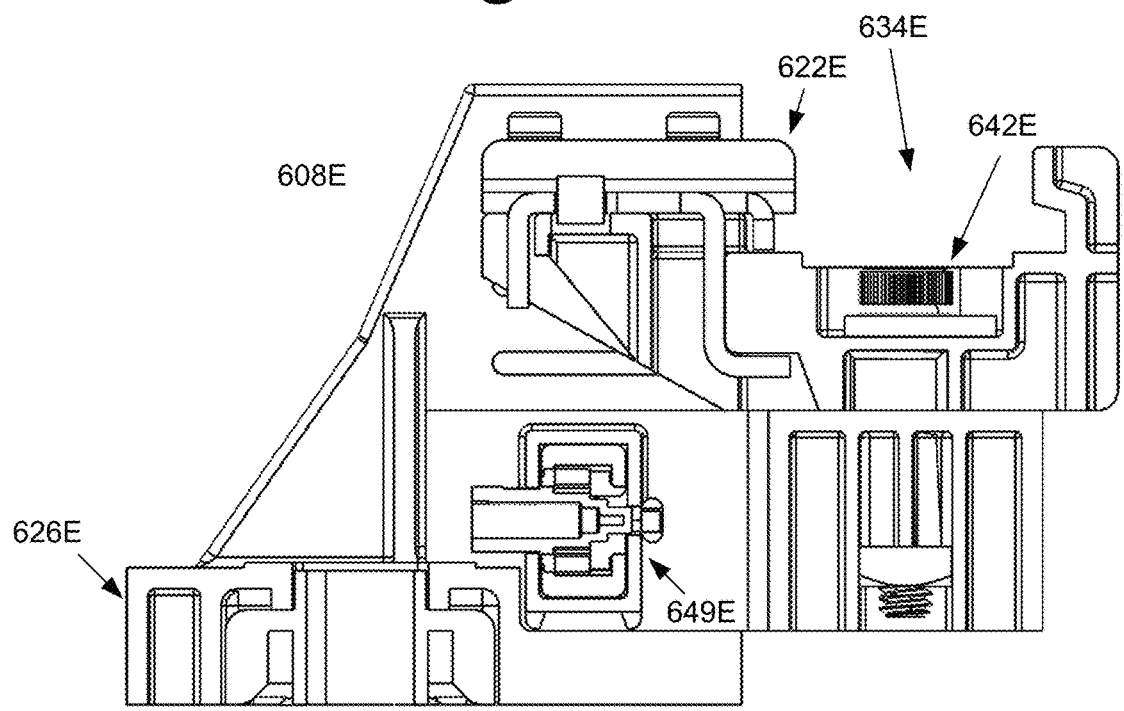
Figure 6F:
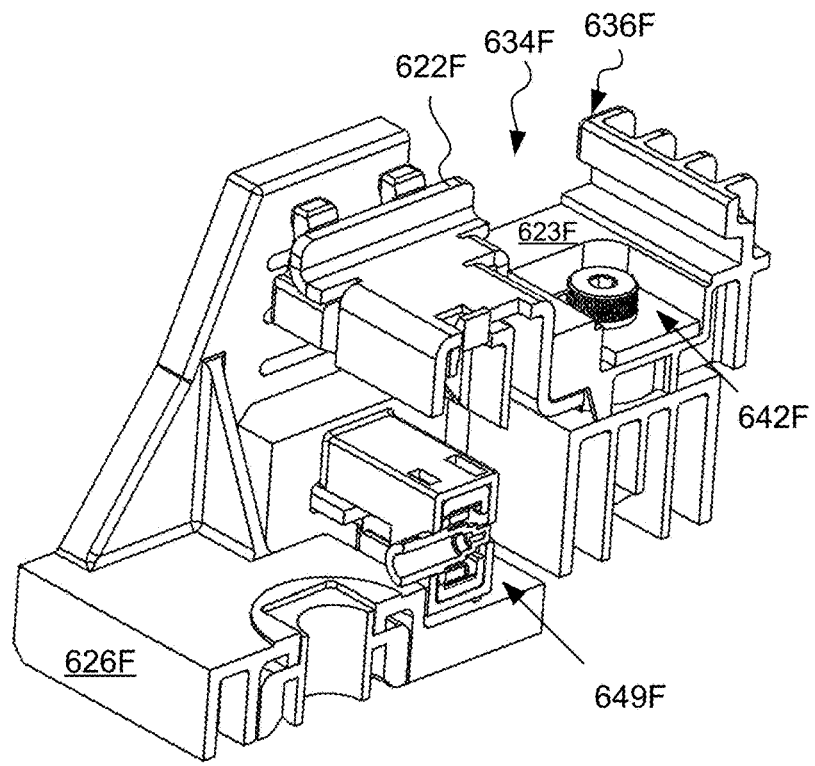
Figure 6G:
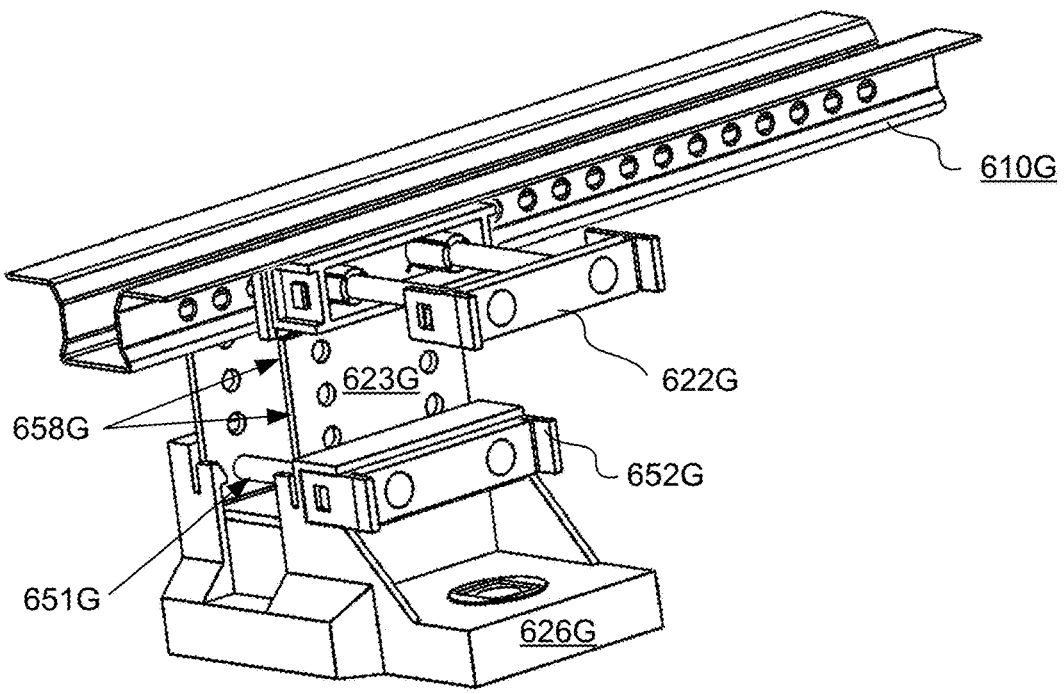
Figure 6H:
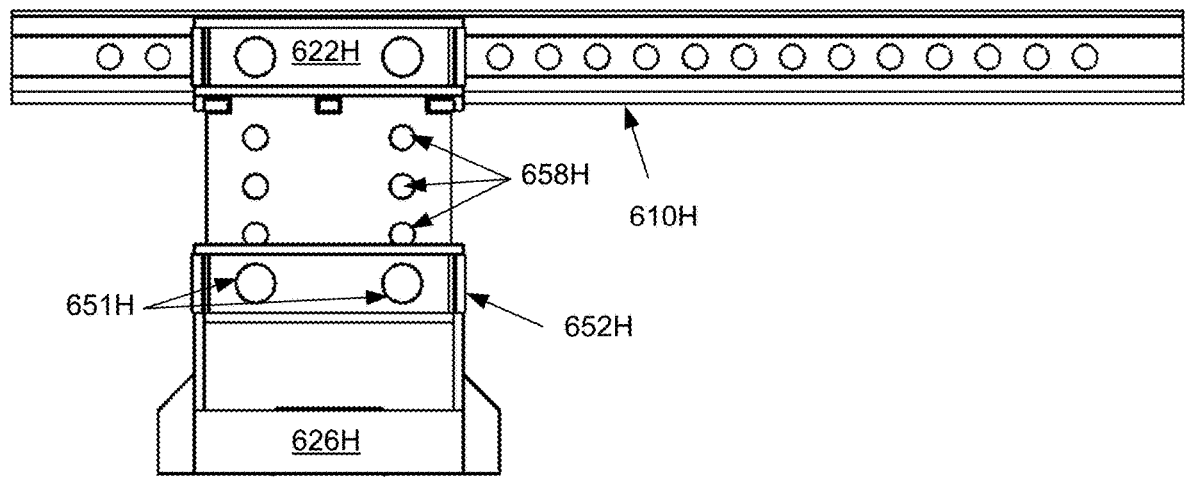
Figure 6I:
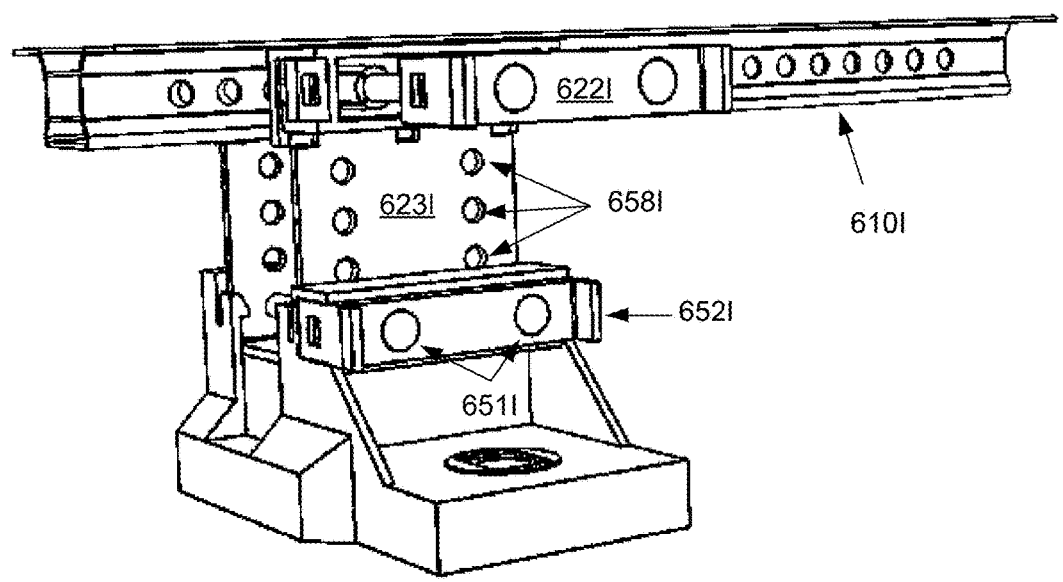
Figure 6J:
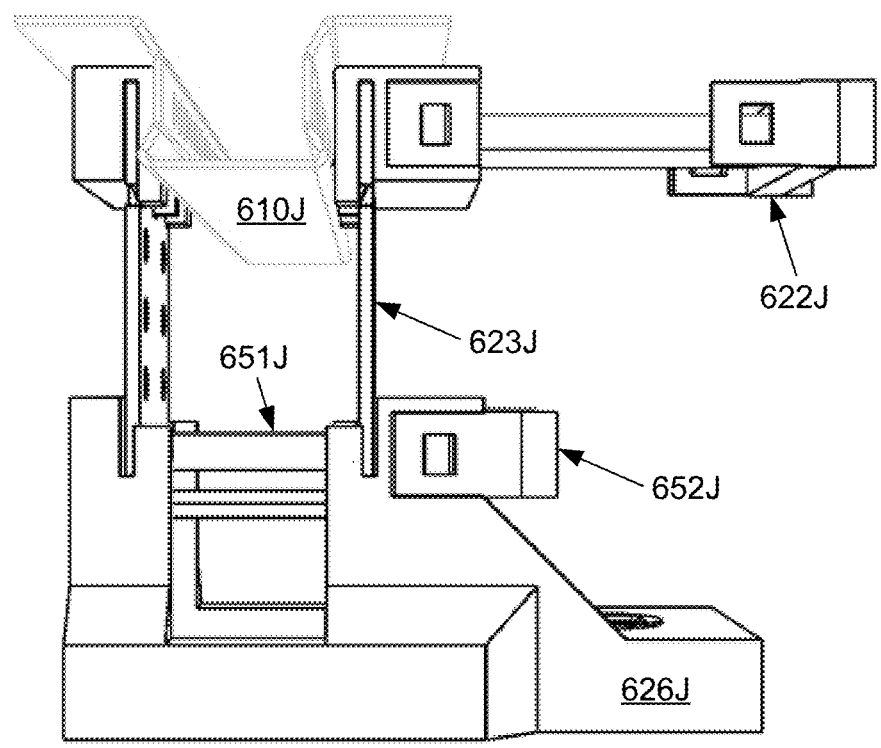

FIGS. 6C through 6F describe another embodiment of the mounting foot 608C-F that is configured for coupling with a panel rail that is attached to a backside surface of a preassembled solar panel module 602C-F and that has specific features that can be engaged by a module foot clip insertion method. These embodiments show unique adjustment features for the foot 608C-F. In FIG. 6C, we see the same rail clip 622C as in other embodiments with the addition of a foot adjuster handle 640C for manually adjusting relative orientations of the rail clip base 623C and foot arm 632C. The foot 608C may be adjusted between two or more foot adjustment levels 658C-J by actuating the foot adjuster handle 640C. In FIGS. 6E and 6F, we see a section through the mounting foot 608E-F detailing the foot arm pivot 642E-F that includes a foot arm pivot bolt 646E-F and a foot arm pivot nut 648E-F. A rack and pinion mechanism foot adjustment 649F is also shown in section.

FIGS. 6G through 6J describe an additional example of a mounting foot 606G-J that uses a foot double pin clip 622G-J instead of a rail clip 622A-F. The pin clip 622G-J serves to lock into a selected pair of a series of holes in the clip base 623G-J and in certain embodiments also to a panel rail with cutouts (see, e.g., FIGS. 29D and 29H). This embodiment uses a pinned foot adjuster 652G-J above the foot base 626G-J to set a selected relative positioning of the clip base 623G-J and the foot base 626G-J.

Figure 7:
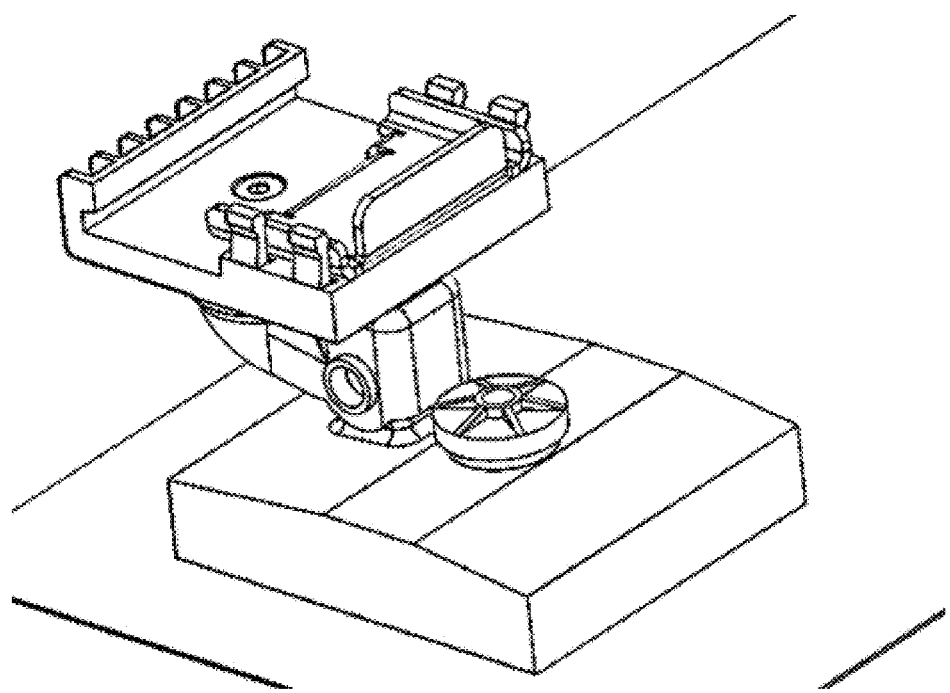
FIGS. 7-8 schematically illustrate perspective views of the mounting foot of FIG. 6 coupled to a roof or other sunlight receiving surface location in accordance with certain embodiments.
Figure 8:
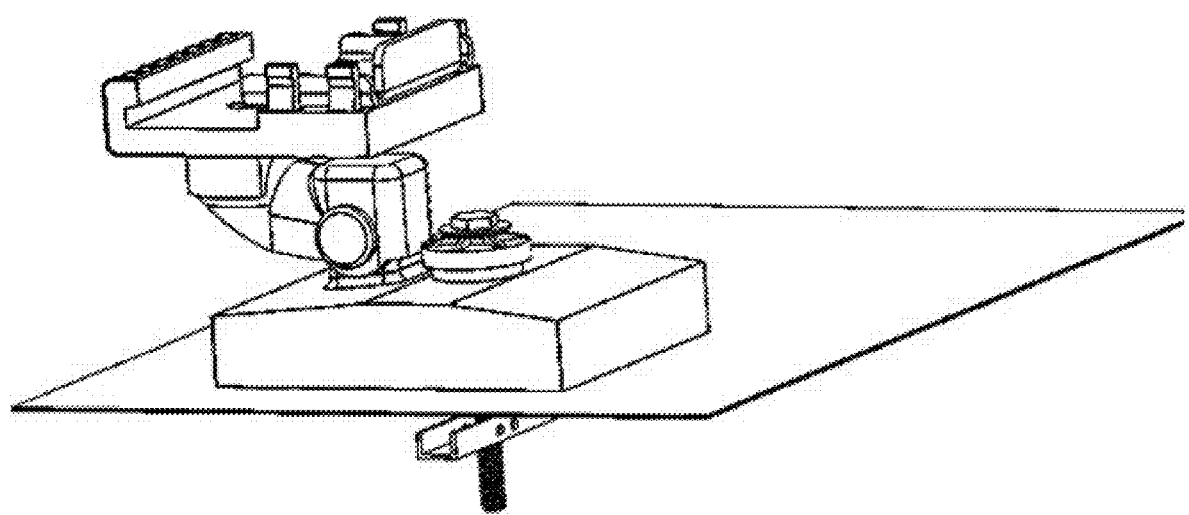

FIGS. 7-8 schematically illustrate perspective views of the mounting foot 708, 808 of FIG. 6A coupled to a roof or other sunlight receiving surface location in accordance with certain embodiments.

Figure 9:
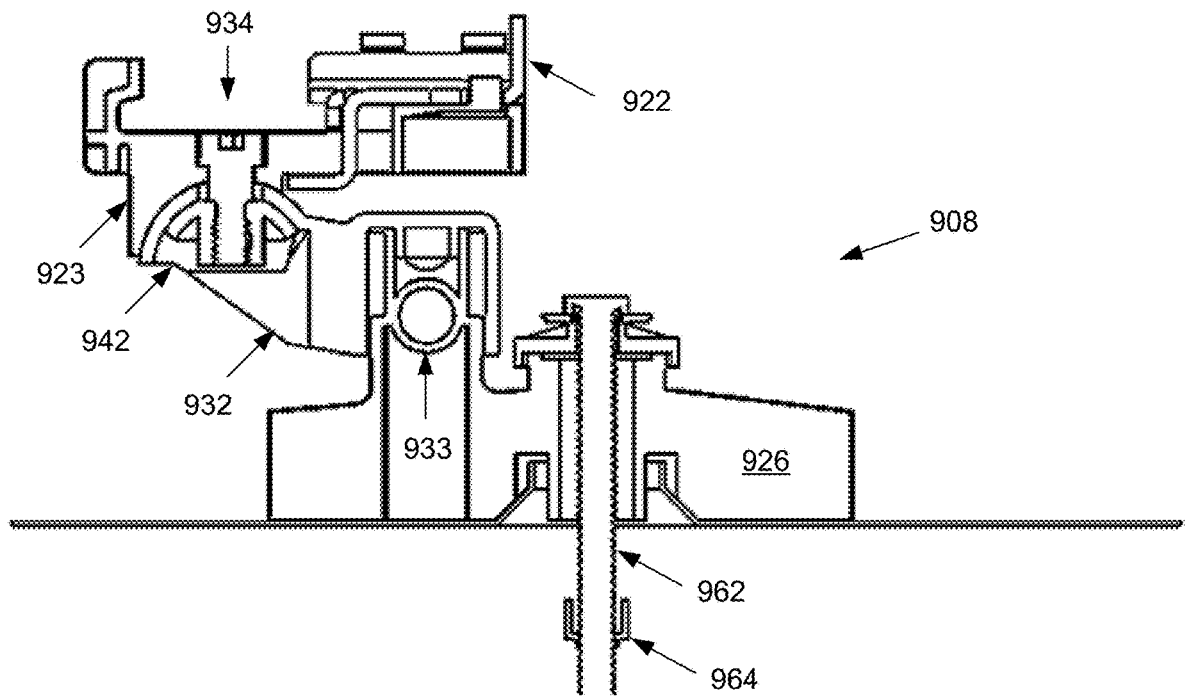
FIGS. 9-11 schematically illustrate, respectively, side views of the mounting foot of FIGS. 6-8 (i) with the slide lock disposed in the second position in FIG. 9, (ii) with the slide lock being disposed in the first position in FIG. 10 to permit a rail to be received into the rail-receiving recess (or to permit decoupling from a rail), and (iii) with the slide lock disposed again in the second position in FIG. 11 to secure a received rail within the recess.
Figure 10:
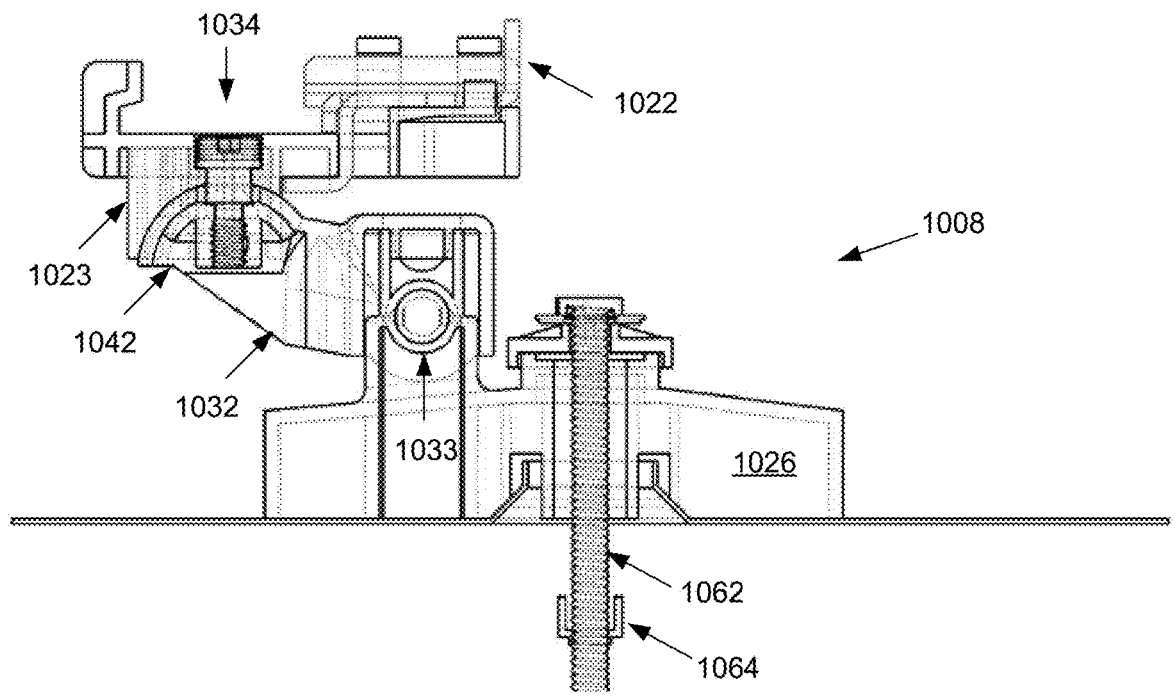
Figure 11:
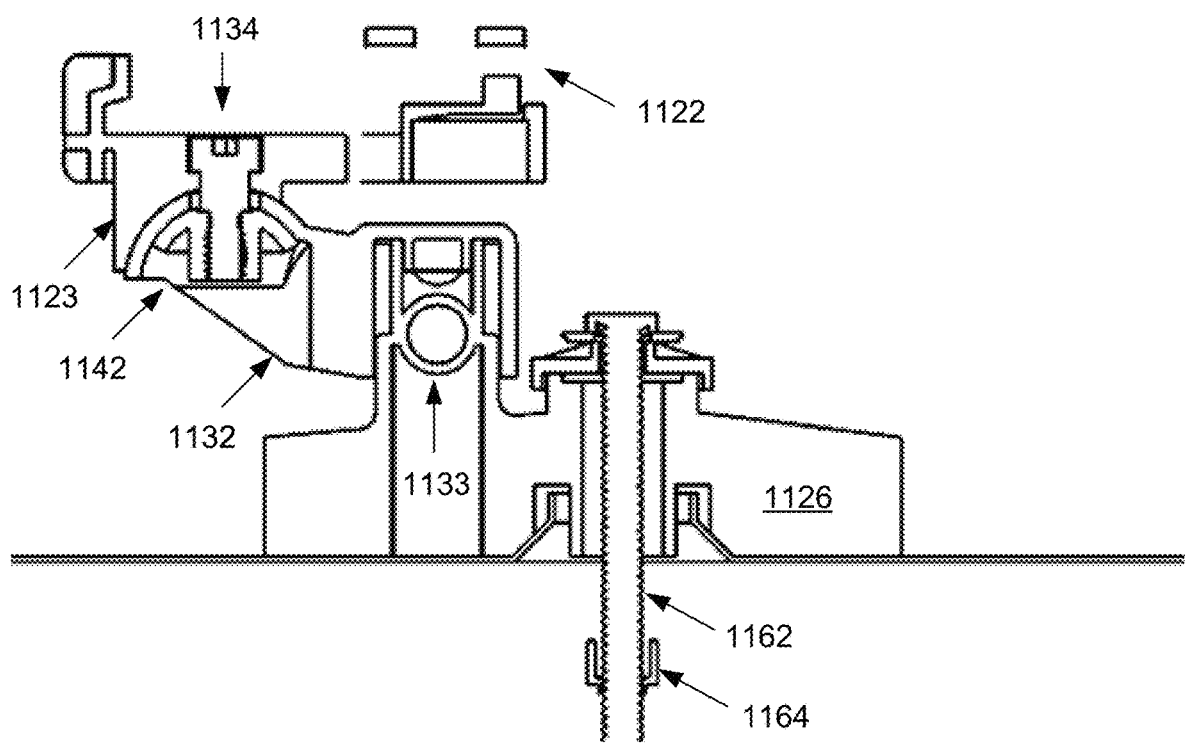

FIGS. 9-11 schematically illustrate, respectively, side views of the mounting foot 902 of FIG. 6A (i) with a slide lock, rail clip 922 disposed in the second position (or locked position) in FIG. 9 wherein the recess 934 is not capable of coupling nor decoupling from a panel rail, (ii) with the rail clip 1022 being disposed in the first position (unlocked position) in FIG. 10 to permit a rail to be received into the rail-receiving recess 1034 (or to permit decoupling from a rail), and (iii) with the slide lock, rail clip 1122 disposed again in the second position in FIG. 11 (in section view) to secure a received rail within the recess 1134.

In FIGS. 9, 10 and 11, we see additional examples of an arm pivot 933, 1033, 1133 and a foot pivot 942, 1042, 1142 and the hex bolt and toggle, all in section. The pivots as previously described serve to reduce the stress and strain on the mounting foot due to typical loads expected during the service life of the preassembled, solar power panel module array, such as wind and snow loading.

Figure 12:
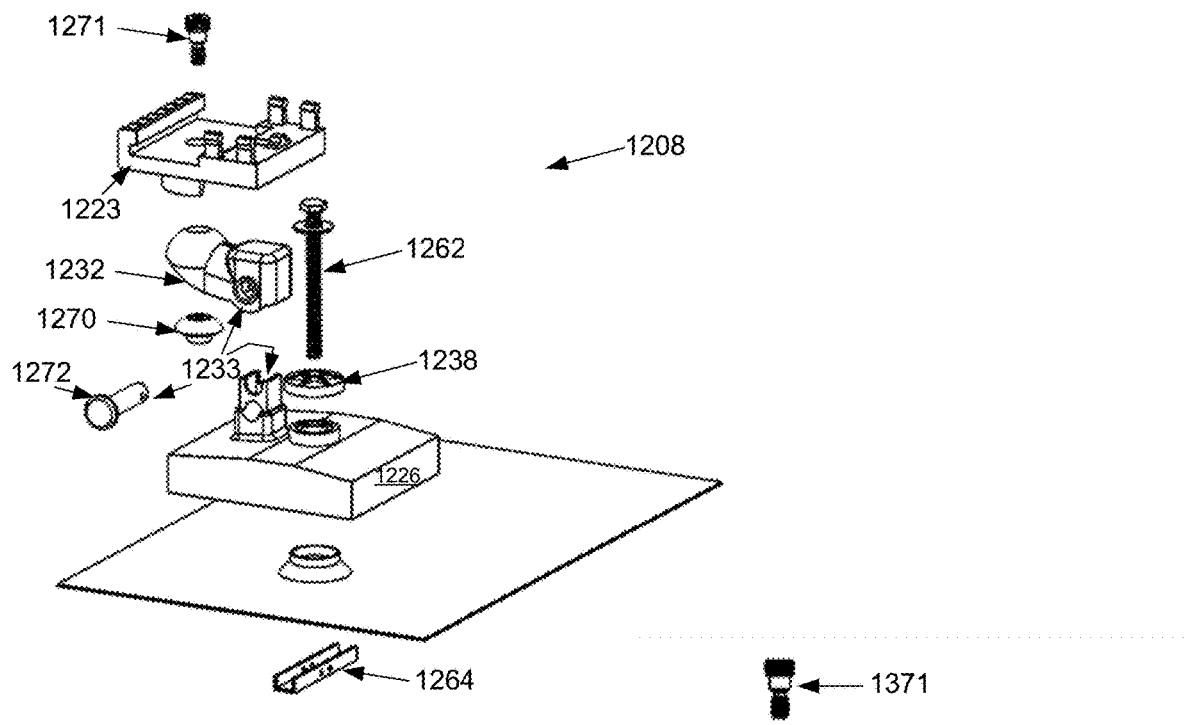
FIGS. 12-13 schematically illustrate exploded perspective and side views, respectively, of the mounting foot of FIG. 6.

FIG. 12 is an exploded view of a mounting foot in accordance with certain embodiments. The mounting foot 1208 includes a foot base 1226 coupled to a foot arm 1232 at a pivot coupling 1233 that permits rotational movement of the arm 1232 relative to the base 1226 around a rotation axis of a foot base pin 1272. A rail clip 1223 is also coupled to the foot arm 1232 at a pivot coupling 1242, wherein an arm pivot nut 1270 and arm pivot bolt 1271 of the pivot 1242 are shown in the example embodiment of FIG. 12.

Figure 13:
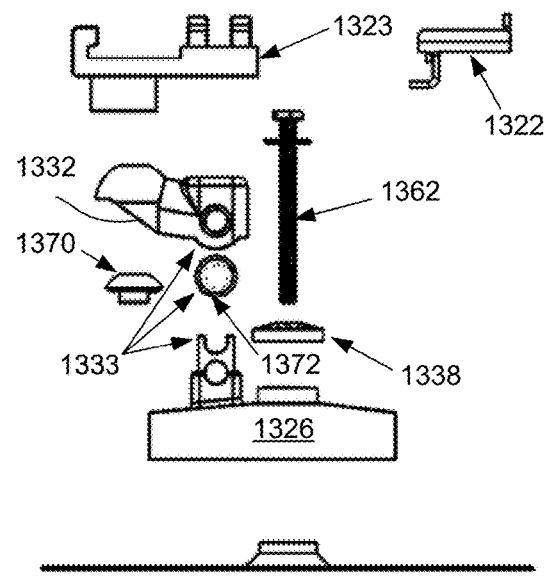

FIG. 13 is an exploded view of a mounting foot in accordance with certain embodiments. The mounting foot 1308 includes a foot base 1326 coupled to a foot arm 1332 at a first pivot coupling 1333 that permits rotational movement of the arm 1332 relative to the base 1326 around a rotation axis of a foot base pin 1372. A fixed rail clip component 1323 and a slidable rail clip component 1333 are coupled to the foot arm 1332 at a second pivot coupling 1342, wherein an arm pivot nut 1370 and arm pivot bolt 1371 of the pivot 1342 are shown in the example embodiment of FIG. 13.

Figure 14A:
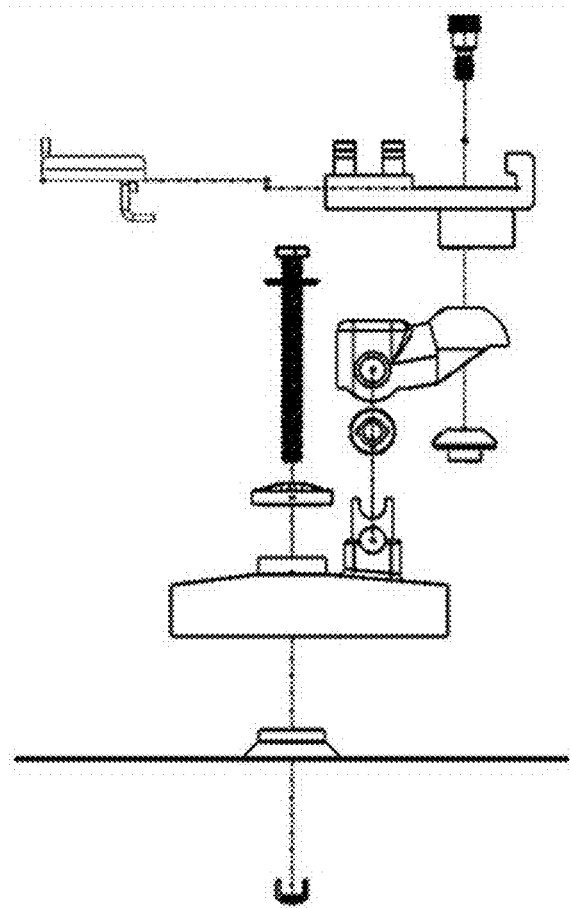
FIGS. 14A-14B schematically illustrate exploded side views of mounting feet that are configured for respectively coupling either side of a solar panel module to a roof or other sunlight receiving surface location in accordance with certain embodiments.
Figure 14B:
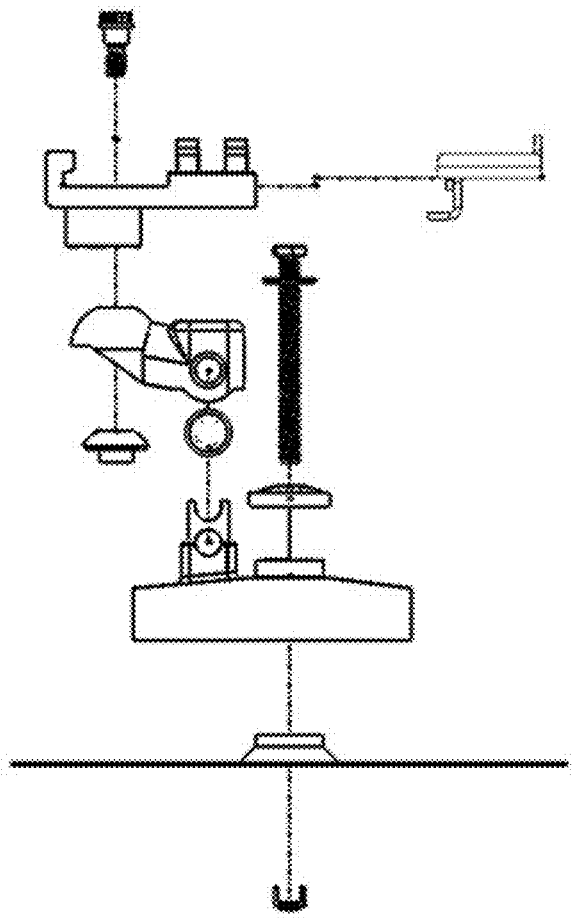

FIGS. 14A-14B schematically illustrate exploded side views of mounting feet similar to the examples of FIGS. 12-13 that are configured for respectively coupling either side of a solar panel module to a roof or other sunlight receiving surface location in accordance with certain embodiments.

Figure 15:
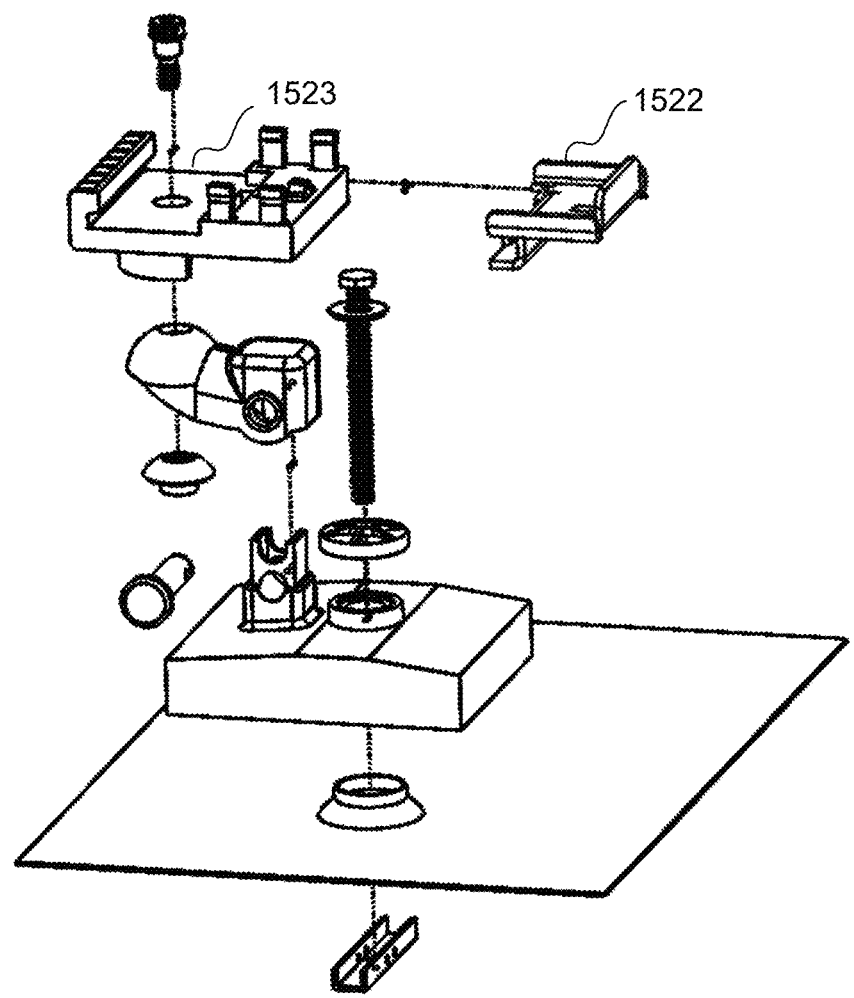
FIG. 15 schematically illustrates an exploded perspective view of a mounting foot that is configured for coupling a preassembled solar panel module to a roof or other sunlight receiving surface location in accordance with certain embodiments, wherein the example mounting foot that is schematically illustrated in FIG. 15 is configured to couple to one of multiple panel rails that are attached to the backside of the preassembled solar panel module.
Figures 16A, 16B:
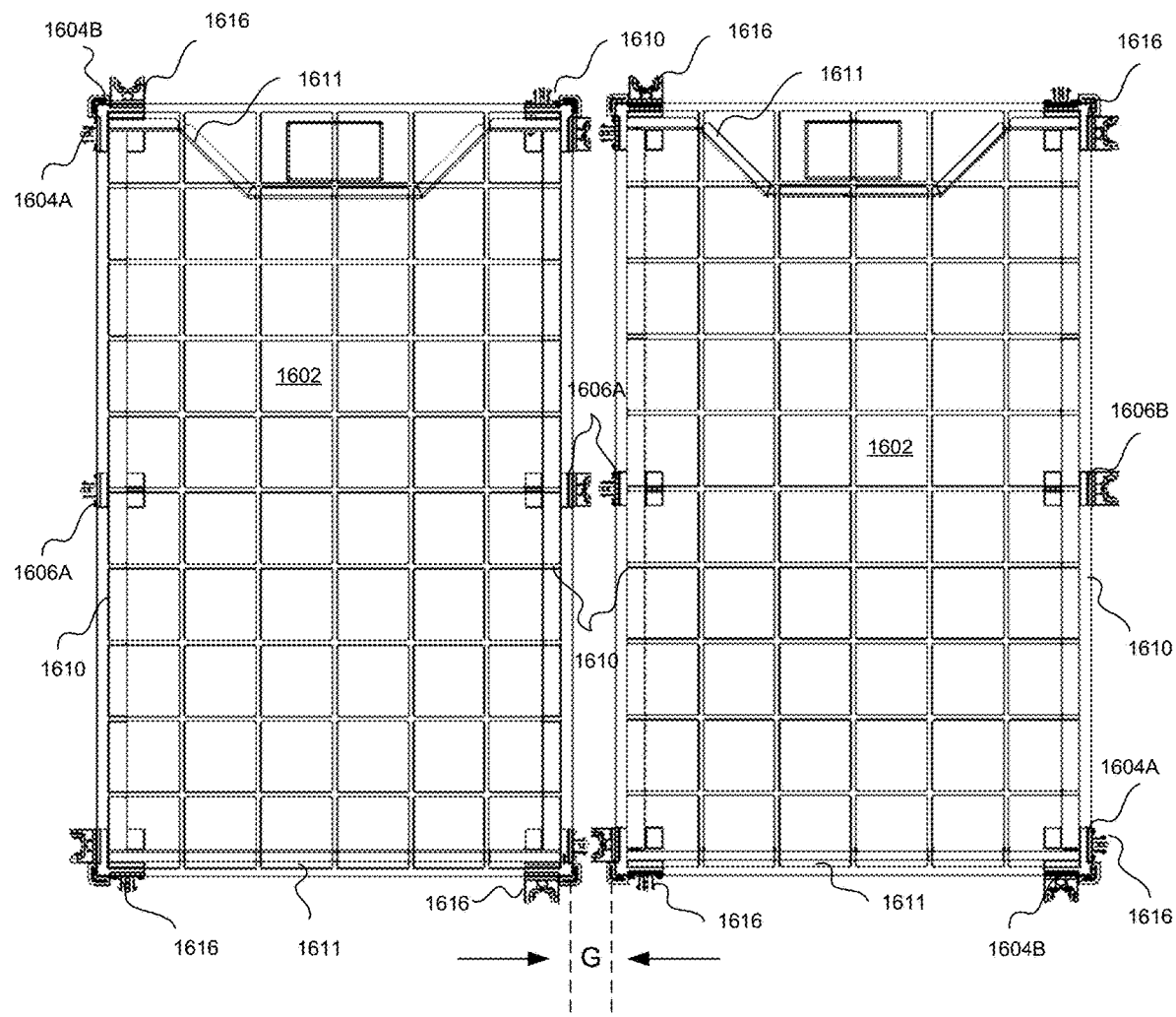
FIGS. 16A-16B schematically illustrate backside views respectively of end and interior solar panel modules each having long and short panel rails that are coupled to a backside surface of the preassembled solar panel modules, wherein each of the solar panel modules of FIGS. 16A-16B also include snap connector brackets at each corner where the long and short panel rails meet and snap connector components attached at mid-rail locations to the long panel rails in accordance with certain embodiments.
Figure 16C:
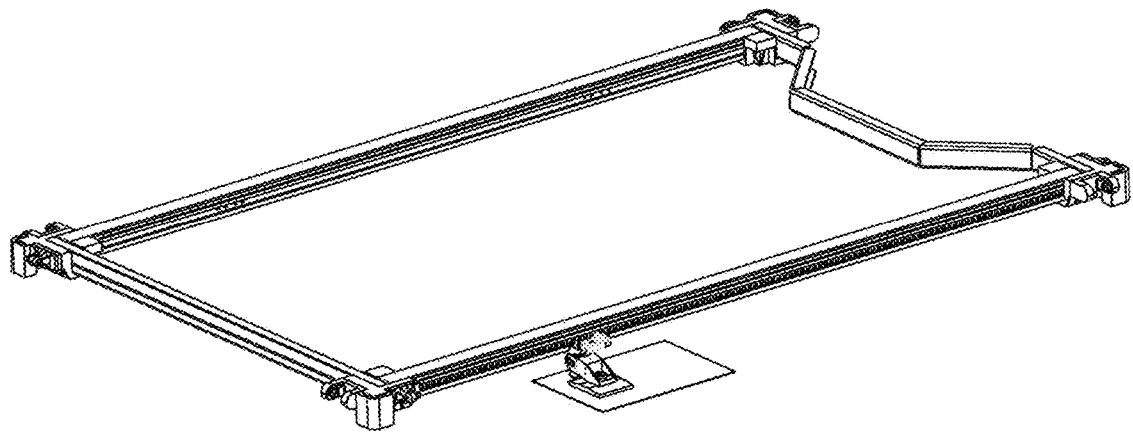
FIGS. 16C-16F schematically illustrate example embodiments of panel rail architectures, snap connector brackets and mid-rail components, corner bumpers and mounting feet that are configured for coupling to a backside surface of a solar panel to form a preassembled solar panel module in accordance with multiple example embodiments.
Figure 16D:
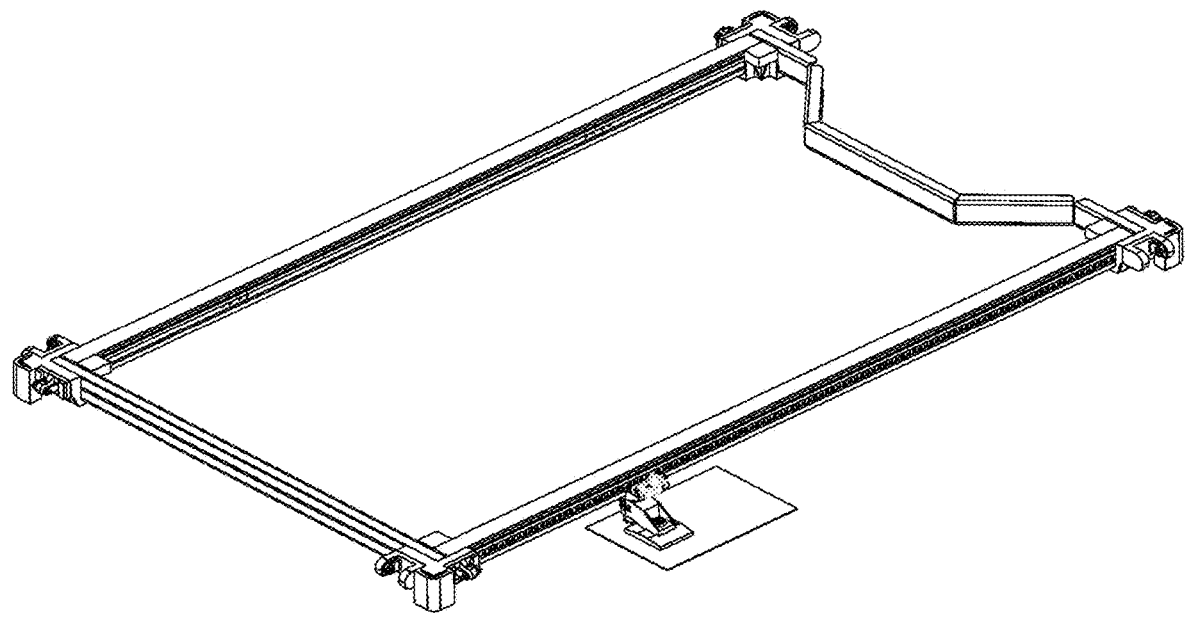
Figure 16E:
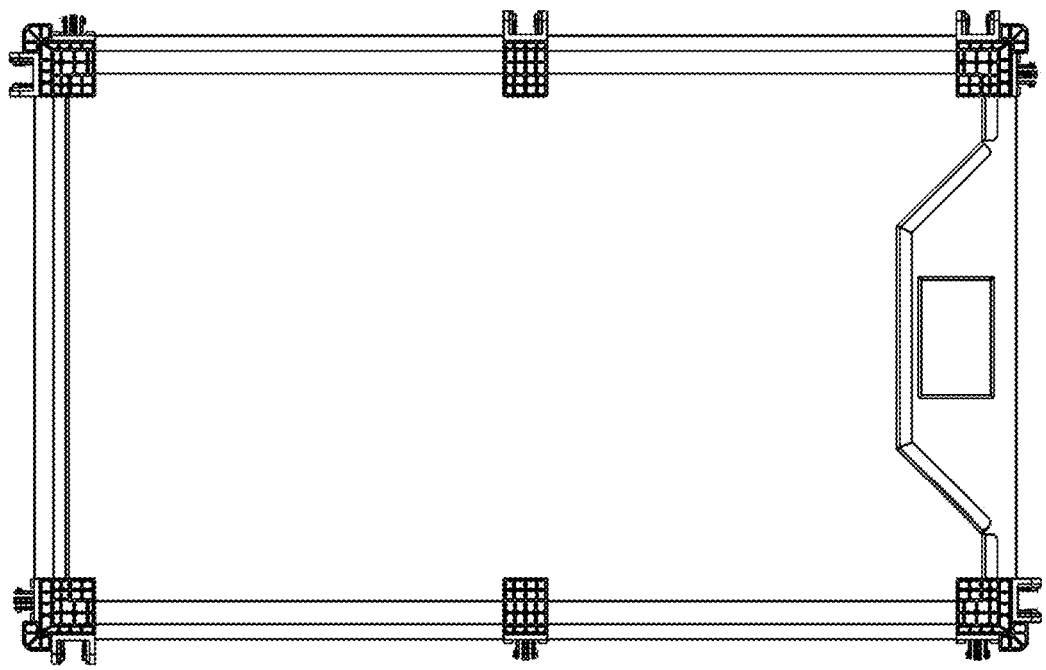
Figure 16F:
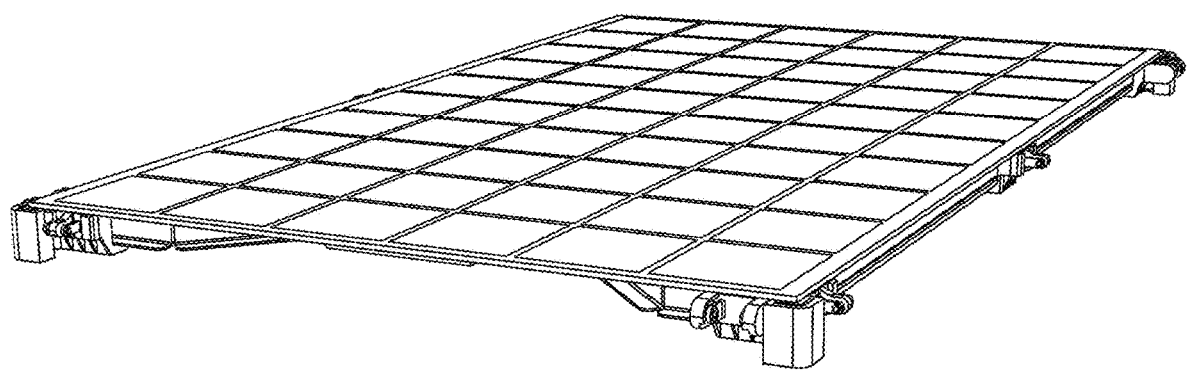
Figure 17:
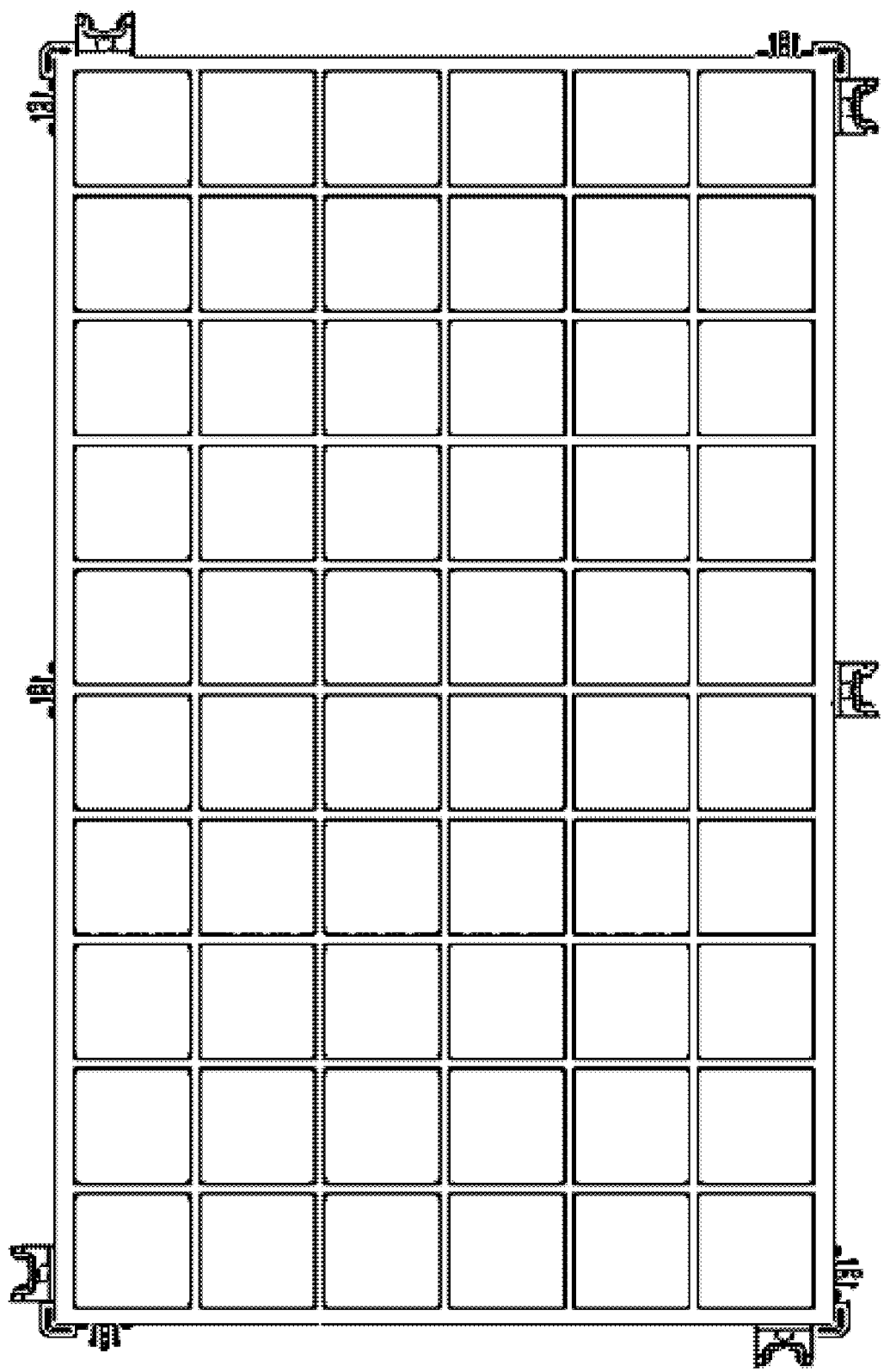
FIG. 17 schematically illustrates a frontside view the interior solar panel module of FIG. 16B.
Figure 18:
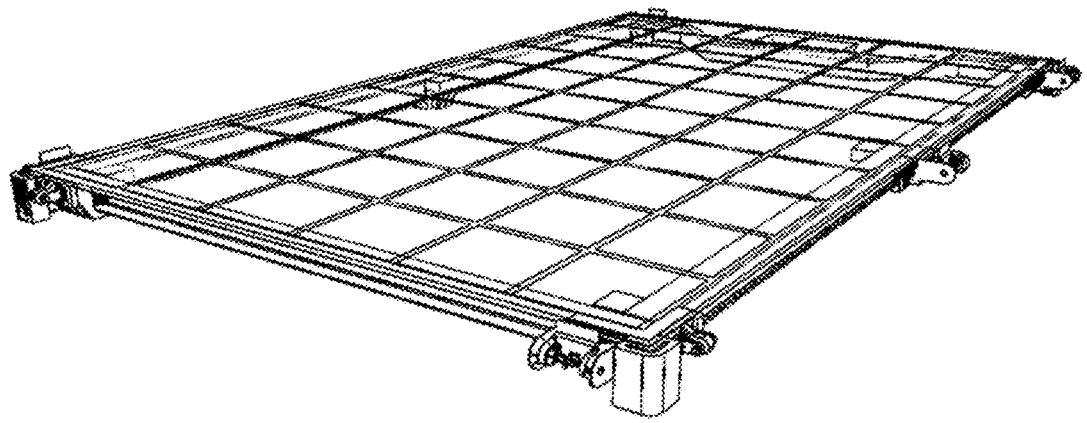
FIGS. 18-20 schematically illustrate perspective, partial perspective, and side views, respectively, of the end solar panel module of FIG. 16A.
Figure 19:
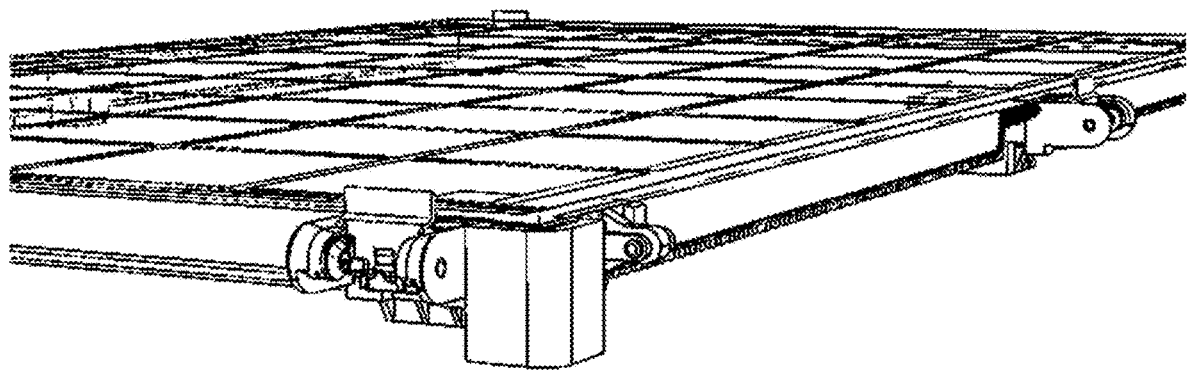
Figure 20:
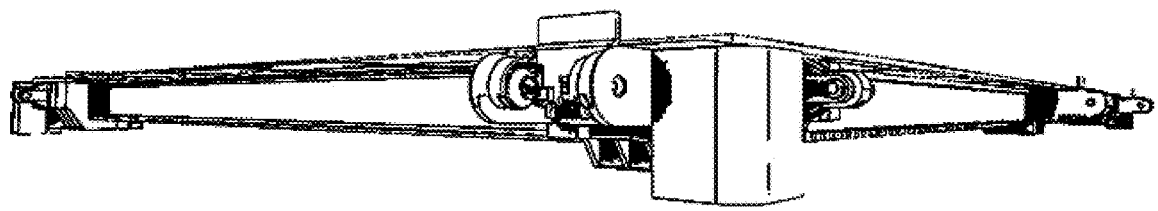
Figure 21:
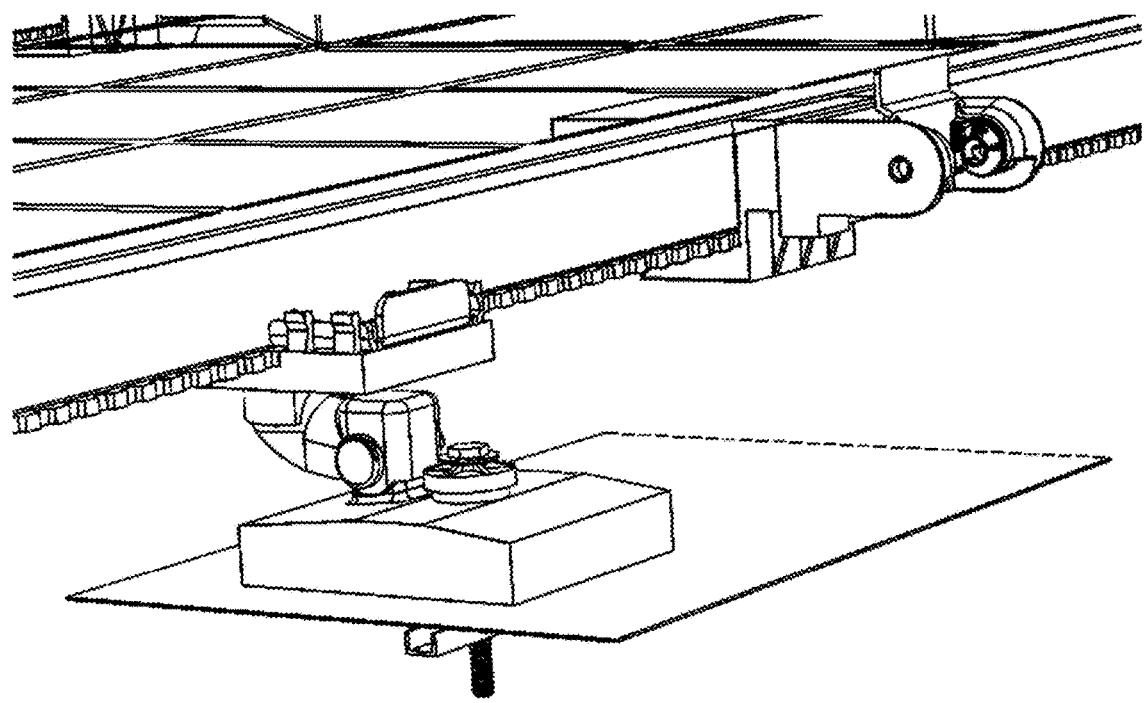
FIG. 21 schematically illustrates a preassembled solar panel module including a panel rail, a snap connector component and a mounting foot coupled to a backside surface of a solar panel to form a preassembled solar panel module in accordance with certain embodiments, wherein the snap connector component and the mounting foot are shown coupled to the panel rail at different locations for, respectively, coupling the preassembled solar panel module to an adjacent preassembled solar panel module of an installed array and for coupling the preassembled solar panel module directly to a roof or other sunlight receiving surface location.

FIG. 15 illustrates a sliding relative movement between the fixed rail clip component 1523 and the slider 1522 for securing the mounting foot 1508 to a panel rail that is coupled to a backside surface of a preassembled solar panel module in accordance with certain embodiments.

Brackets 1616 that include snap connectors 1604a, 1604B can couple long rails 1610 to short rails 1611 in certain embodiments, e.g., as illustrated in the examples of FIGS. 16A-16F. Adjacent modules such as in FIGS. 16A-16B can be coupled together by snap coupling, e.g., two complimentary pairs of corner snap couplers 1604A, 1604B and a complimentary pair of side snap couplers 1606A, 1606B. An edge to edge gap is precisely defined by the sums of the extents of protrusion of the snap couplers from the edges of the modules minus the overlap of coupled complimentary pairs, which in certain embodiments may be 1.5 inches or more.

FIGS. 17-21 schematically illustrate examples of preassembled solar panel modules including snap connector components are various locations protruding away from solar panel edges for coupling with complimentary snap connector components on adjacent modules in an installed array. Brackets can couple to ends of one or two rails and can include snap couplers. Brackets can also couple long and short rails together anywhere along rails. Brackets can be anywhere along rails, not necessarily in the corners only.

Figure 22A:
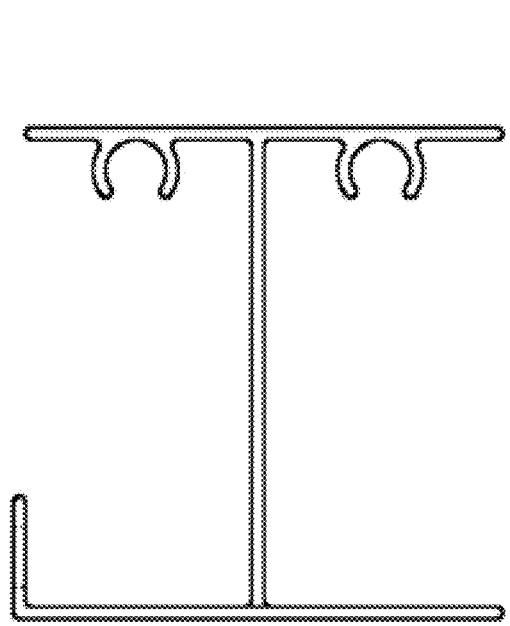
FIG. 22A-22B schematically illustrate end and partial perspective views, respectively, of a panel rail that is configured for coupling to a backside of a preassembled solar panel module and to one or more mounting feet and one or more snap connector brackets and/or mid-rail snap connector components in accordance with certain embodiments.
Figure 22B:
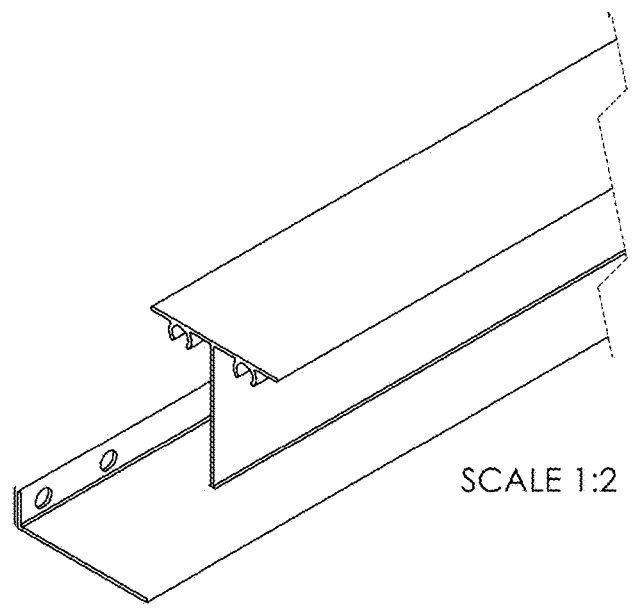

FIG. 22A-22B schematically illustrate end and partial perspective views, respectively, of a panel rail that is configured for coupling to a backside of a preassembled solar panel module and to one or more mounting feet and one or more snap connector brackets and/or mid-rail snap connector components in accordance with certain embodiments.

Figure 22C:
FIGS. 22C-22D schematically illustrate side views of short and long panels, respectively, in accordance with the example embodiment of FIG. 22B.
Figure 22D:
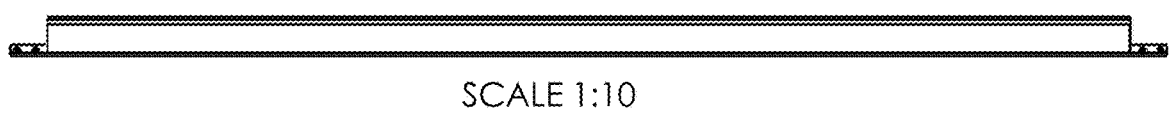

FIGS. 22C-22D schematically illustrate side views of short and long panels, respectively, in accordance with the example embodiment of FIG. 22B.

Figure 23:
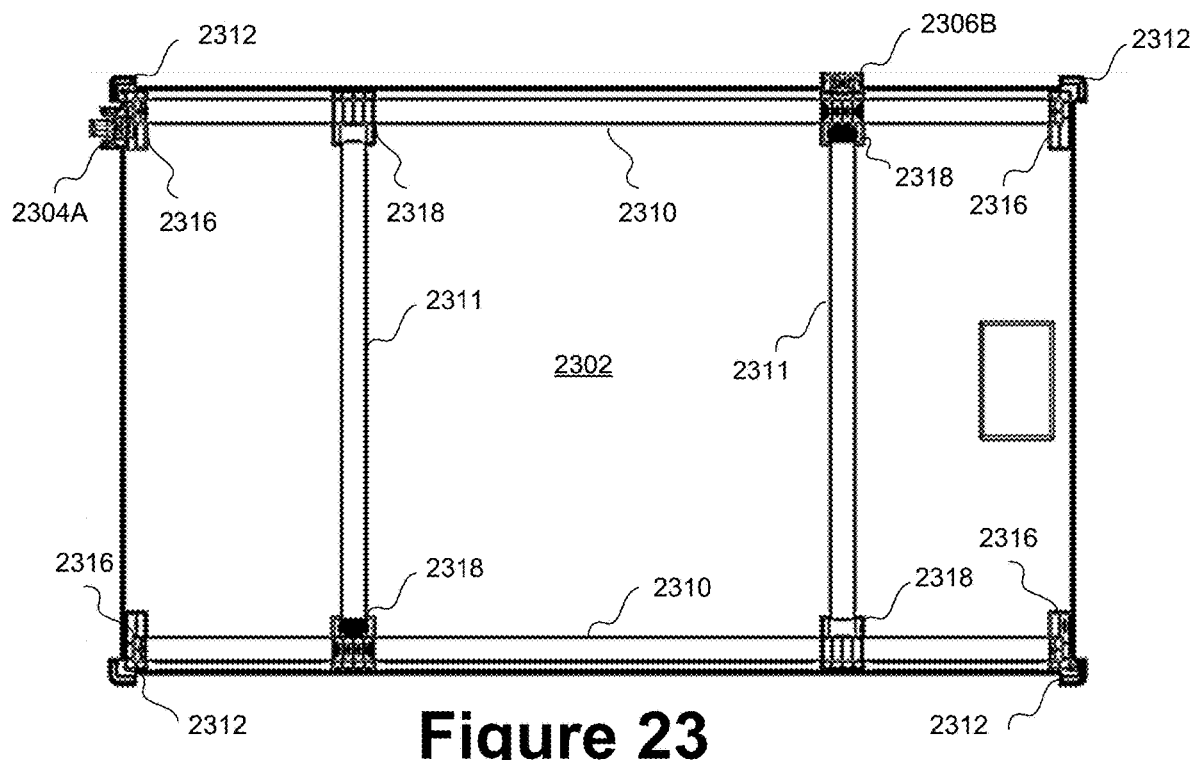
FIG. 23 schematically illustrates a backside view of an opaque preassembled solar panel module that includes two long rails attached near and aligned each with one of two long edges of a rectangular solar panel and two short rails that are spaced a significant distance each from one of two short edges of the rectangular solar panel.

FIGS. 23-29H schematically illustrate an example embodiment of a preassembled solar panel module that includes two long rails disposed along the longest sides of a rectangular preassembled solar panel module and two short rails perpendicular to the long rails and coupling at both ends to inner walls of the long rails. FIG. 23 schematically illustrates a preassembled solar panel module 2302 that includes one corner snap connector 2304A and one side snap connector 2306B that are configured for respectively coupling with a complimentary corner snap connector (not shown, but see 2804B of FIG. 28D) and a complimentary side snap connector (not shown, but see 2806A of FIG. 28D) each to one of two adjacent preassembled solar panel modules. The preassembled solar panel module 2302 also includes two long rails 2310 and two short rails 2311 coupled together at mid-rail brackets 2318, while the ends of each long rail 2310 are coupled to corner brackets 2316.

Figure 24:
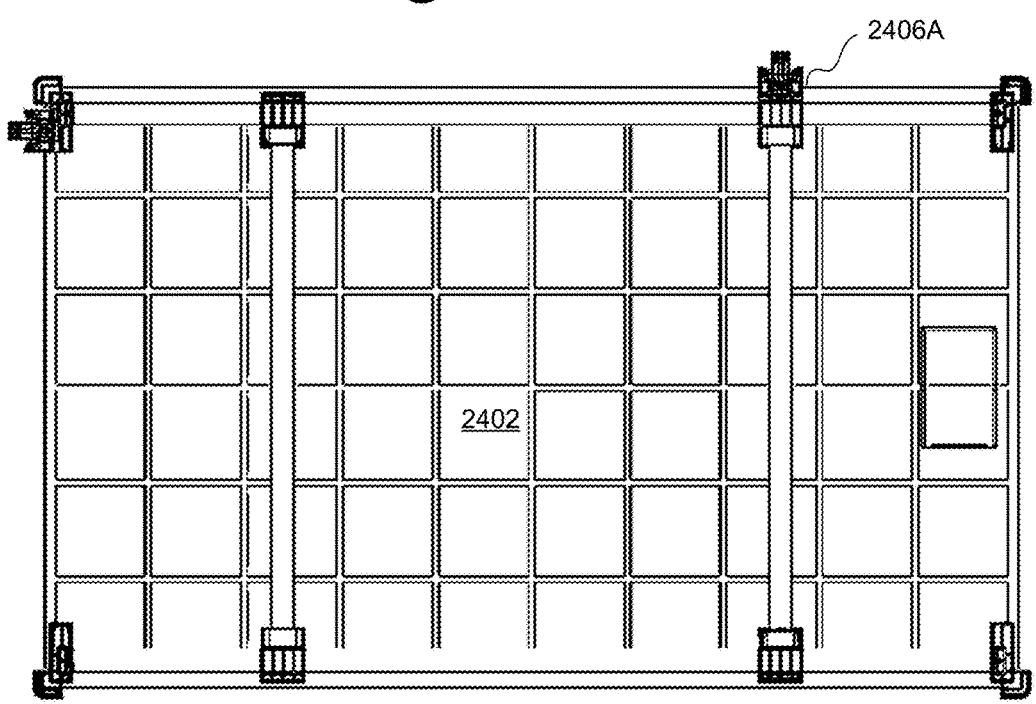
FIG. 24 schematically illustrates a backside view of a transparent solar panel module otherwise having similarly disposed long and short rails as in FIG. 23.

The example preassembled solar panel module 2402 illustrated at FIG. 24 is similar to the module 2302 illustrated at FIG. 23, except that the backside surface of the glass-polymer module 2302 is formed of an opaque polymeric material while the backside surface of the dual glass module 2402 is formed of a transparent glass material. The front surface of each of modules 2302 and 2402 is formed of glass or another transparent material such as a transparent polymer. In addition, the side snap connector 2306B shown in FIG. 23 and the side snap connector 2406A shown in FIG. 24 are compliments of each other, i.e., for snap coupling together to couple adjacent modules within an array.

Figure 25:
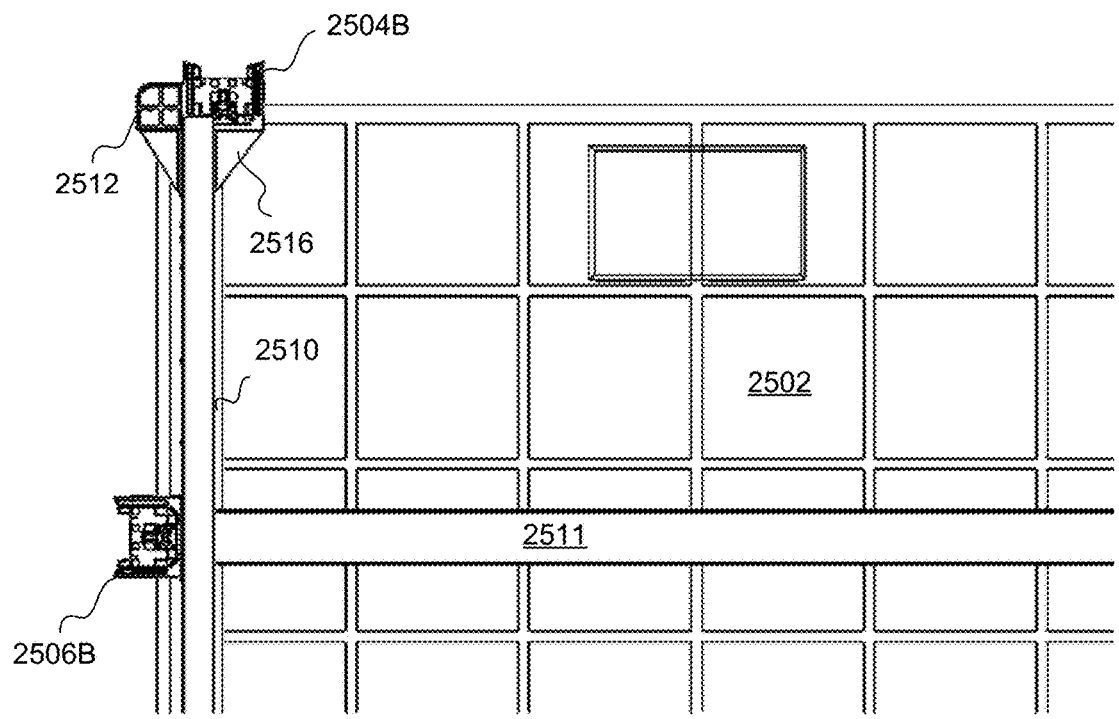
FIG. 25 schematically illustrates a partial backside view of a preassembled solar panel module that includes a snap connector component coupled at ends of each of a short panel rail as in FIG. 22C and a long panel rail as in FIG. 22D, wherein the short and long panel rails are coupled to a backside surface of the preassembled solar panel module as in the example embodiment of FIG. 24.

FIG. 25 schematically illustrates one corner of a module preassembled solar panel module 2502 that includes a corner snap connector 2504B, a side snap connector 2506B, a long panel rail 2510, a short panel rail 2511, a corner bumper 2512 and a corner bracket 2516 that couples together one end of the long rail 2510, the corner bumper 2512 and the corner snap 2504B. The side snap connector 2506B may also serve to facilitate coupling of the long rail 2510 and the short rail 2511.

Figure 26:
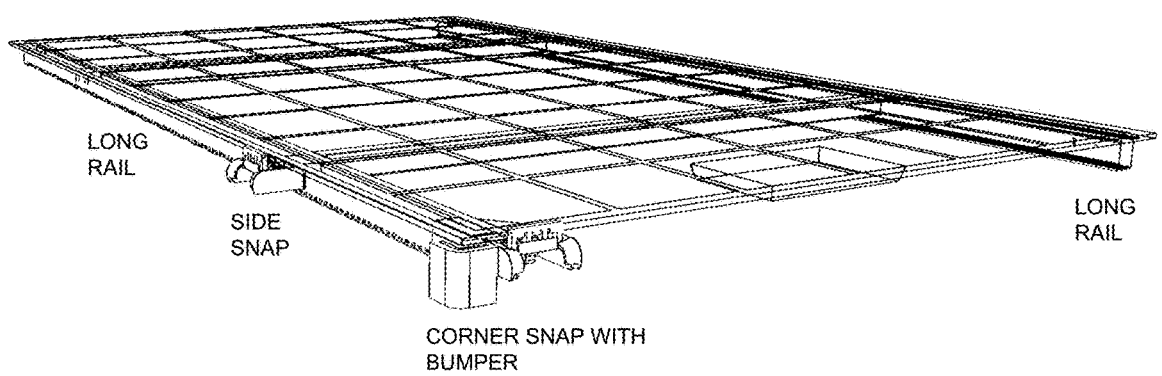
FIG. 26 schematically illustrates a top perspective view of the preassembled solar panel module of FIG. 24.

FIG. 26 schematically illustrates a top perspective view of the preassembled solar panel module of FIG. 24.

Figure 27:
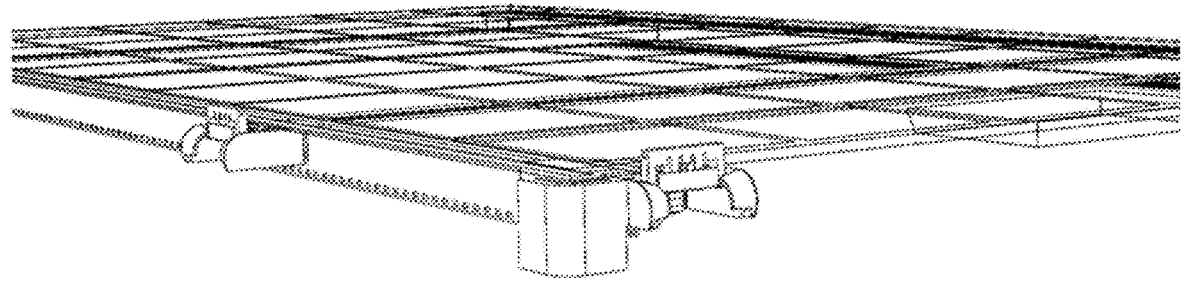
FIG. 27 schematically illustrates a partial top perspective view of the preassembled solar panel module of FIG. 24.

FIG. 27 schematically illustrates a partial top perspective view of the preassembled solar panel module of FIG. 24.

Figure 28A:
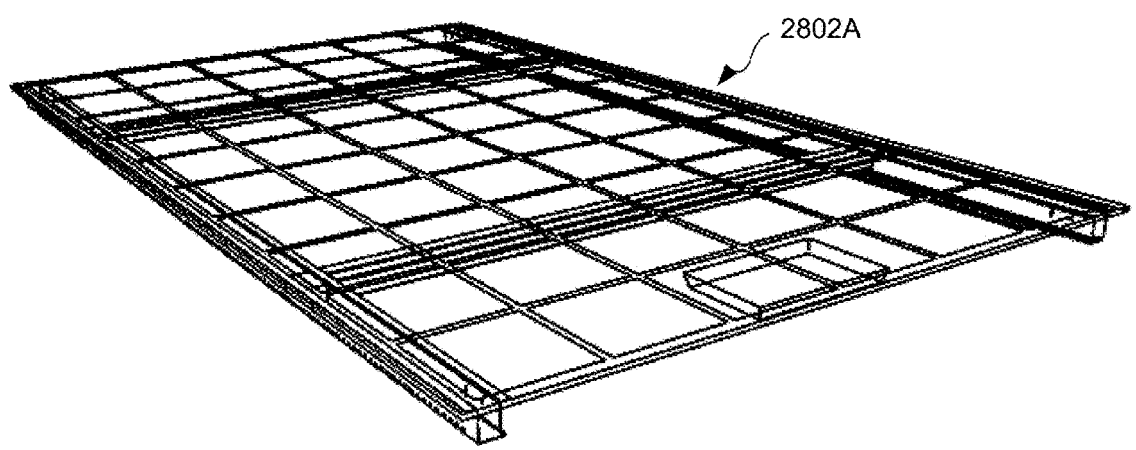
FIG. 28A schematically illustrates a top perspective view of an at least partially preassembled solar panel module including a transparent backside solar panel surface in accordance with certain embodiments that does not show snap connectors coupled at the ends of the long and short rails nor mounting feet.
Figure 28B:
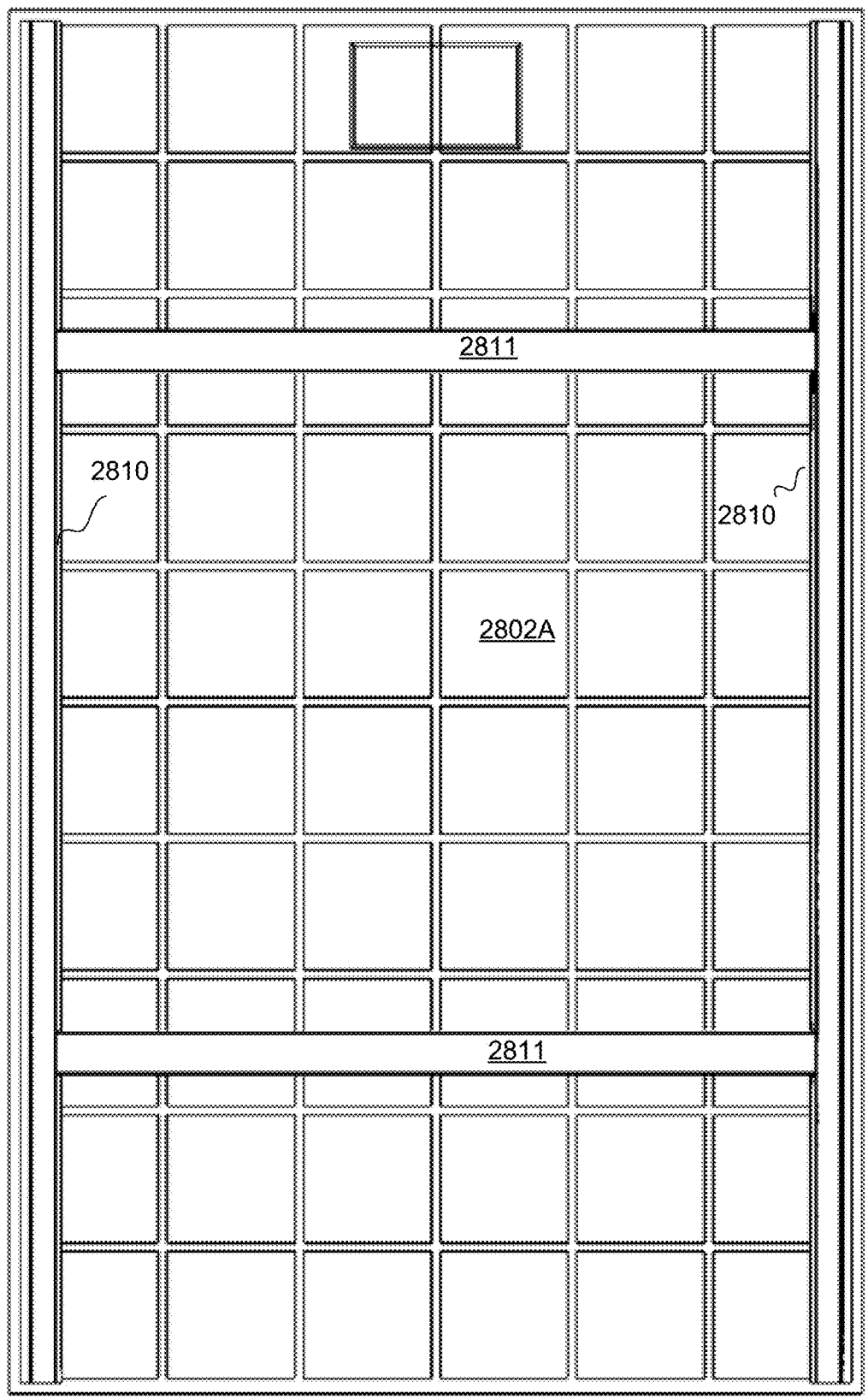
FIG. 28B schematically illustrates a frontside view of the preassembled solar panel module of FIG. 28A.

FIGS. 28A-28B schematically illustrate a preassembled solar panel dual glass module 2802A including two long rails 2810 and two short rails 2812 coupled to a backside glass surface of the module 2802A. The ends of the short rails 2812 may be coupled to the long rails as shown. The glass backside surface of the module 2802A is transparent as illustrated in the example of FIGS. 28A-28B.

Figure 28C:
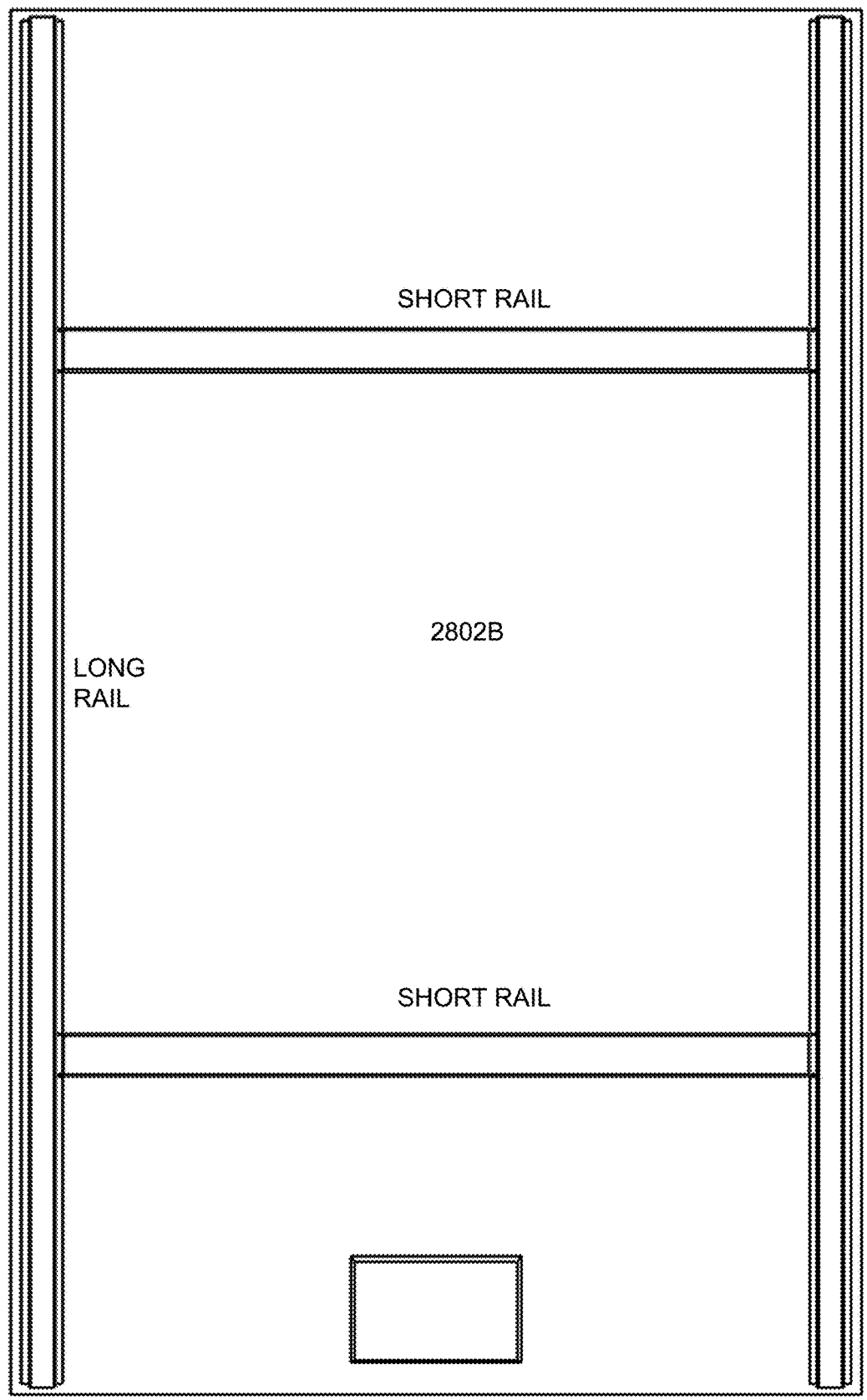
FIG. 28C schematically illustrates a backside view of an at least partially preassembled solar panel module including an opaque backside solar panel surface in accordance with certain embodiments that does not show snap connector components coupled to any of the two long panel rails nor the two short panel rails, nor any mounting feet.
Figure 28D:
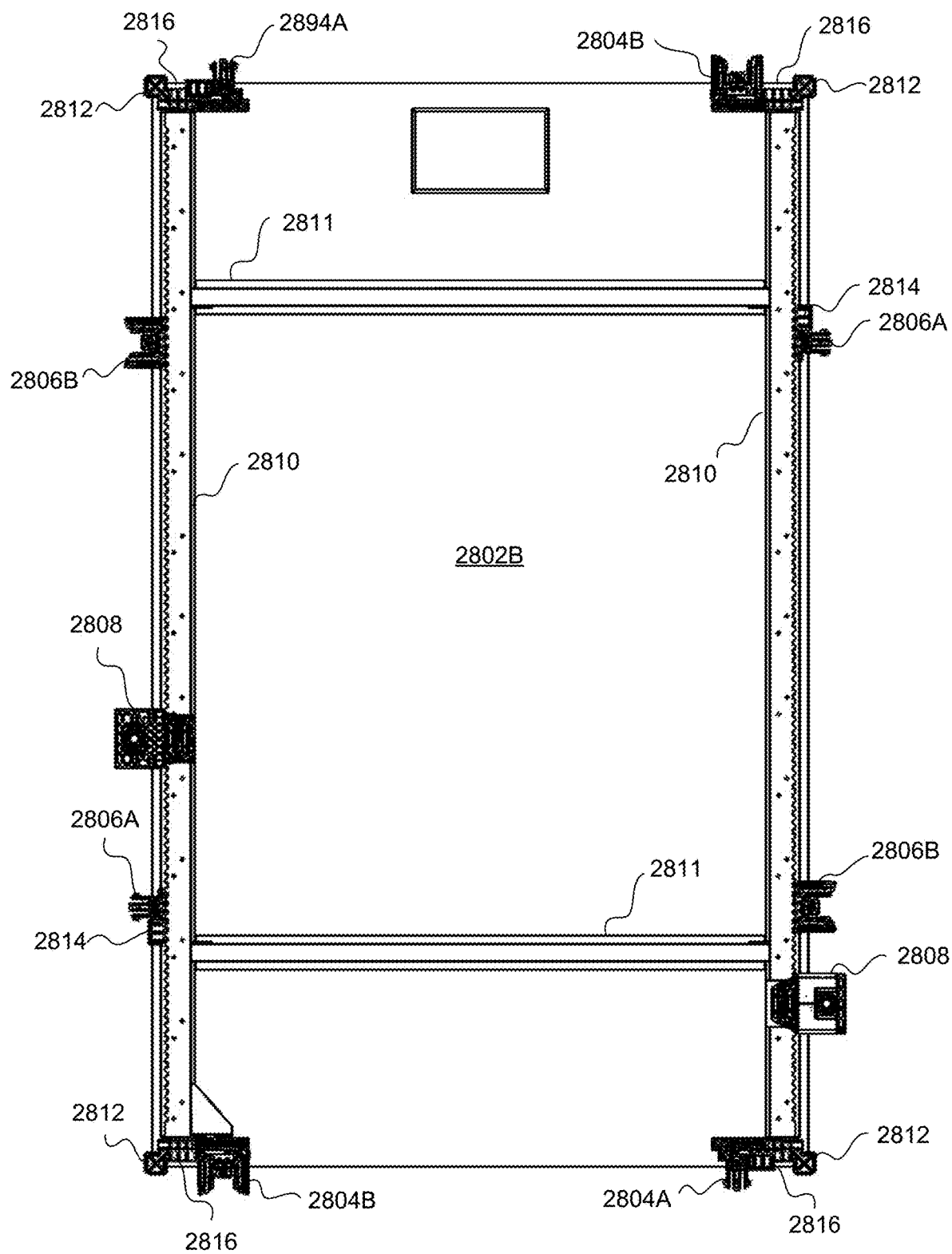
FIG. 28D schematically illustrates a backside view of a preassembled solar panel module including an opaque backside solar panel surface in accordance with certain embodiments that shows snap connector brackets coupled one at each corner of the solar panel module at the ends of two long rails, a pair of short rails, four mid-rail snap connector components coupled two to each of the two long rails, and two mounting feet coupled one to each of the two long rails.
Figure 28E:
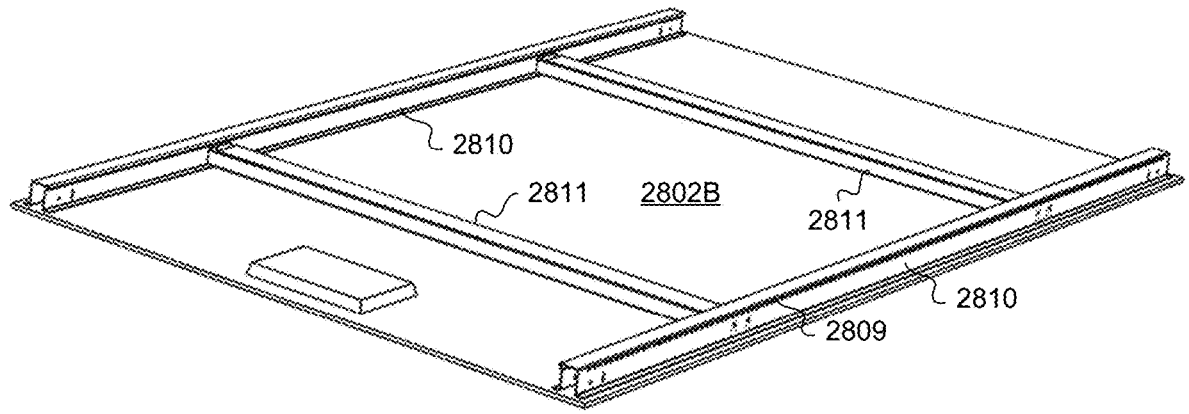
FIG. 28E schematically illustrates a backside perspective view of an at least partially preassembled solar panel module including an opaque backside solar panel surface in accordance with certain embodiments that does not show snap connectors coupled to any of the two notched long rails nor the two short rails, nor any mounting feet.

FIGS. 28C-28E schematically illustrate a preassembled solar panel glass-polymer module 2802B. the polymer back surface is opaque in the example of FIGS. 28C-28E.

FIG. 28D schematically illustrates a preassembled solar panel module 2802 in accordance with certain embodiments that includes two sets of complimentary snaps 2804A, 2804B at the corners of each of two short sides and two sets of complimentary side snaps 2806A, 2806B disposed along each of two long sides not at the corners.

The preassembled solar panel module 2802 of FIG. 28D also includes two mounting feet 2808, each being coupled to one of two long rails 2810 that are coupled to the underside of the module 2802 near the longest sides and aligned parallel to the edges of the longest sides. Two short rails 2811 are also included in the example embodiment of FIG. 28D, and are spaced considerably or significantly from the short side edges. Four corner bumpers 2812 and two side snap bumpers 2814 are also shown schematically in the example of FIG. 28D for protecting the module 2802 from collisions in the events leading to stable coupling within an installed solar array.

Corner brackets 2816 also couple with each end of the two long rails 2810. The corner snaps 2804A, 2804B, the corner bumpers 2812 and the corner brackets 2816 may be separate components, may be coupled together or may be formed as an integral component that serves all three of these functions, or any two may be coupled or integral and separate from the third.

Figure 29A:
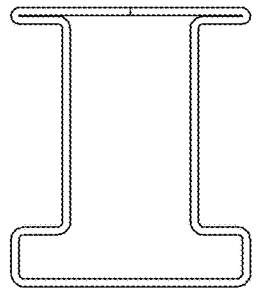
FIGS. 29A-29B schematically illustrate end and side views, respectively, of a long panel rail in accordance with certain embodiments for coupling to a backside of a preassembled solar panel module and for coupling to a pair of short rails disposed as in the example embodiment of FIG. 24.
Figure 29C:
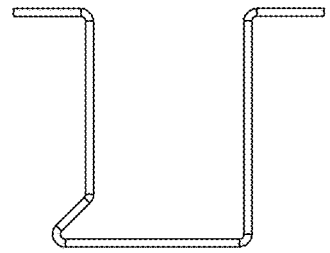
FIGS. 29C-29E schematically illustrate end, perspective and side views, respectively, of a long panel rail that is configured in accordance with certain embodiments for coupling to a backside of a preassembled solar panel module and for coupling to a pair of short rails disposed as in the example embodiments of FIG. 24.
Figure 29D:
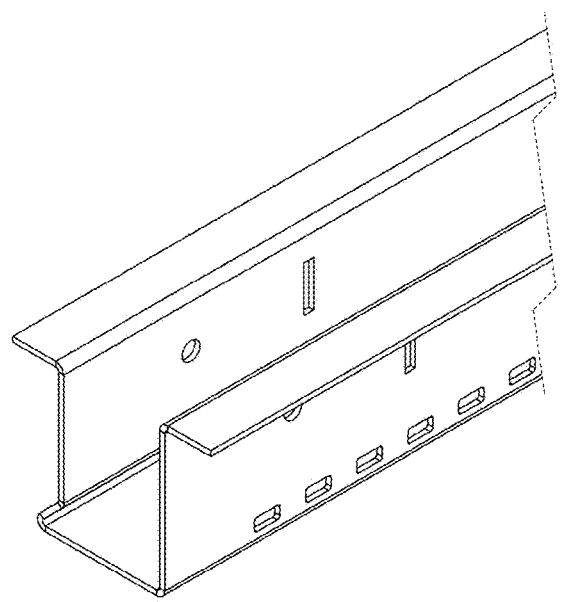
Figure 29G:
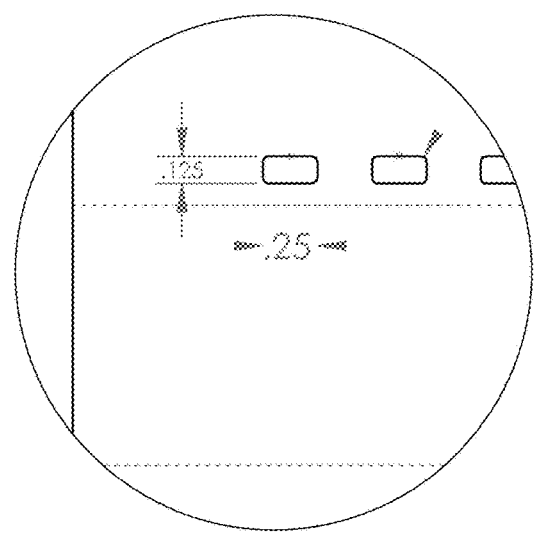
FIGS. 29F-29G schematically illustrate side and partial side views, respectively, of a long panel rail in that is configured in accordance with certain embodiments for coupling to a backside of a preassembled solar panel module and for coupling to a pair of short rails disposed as in the example embodiment of FIG. 24.
Figure 29B:
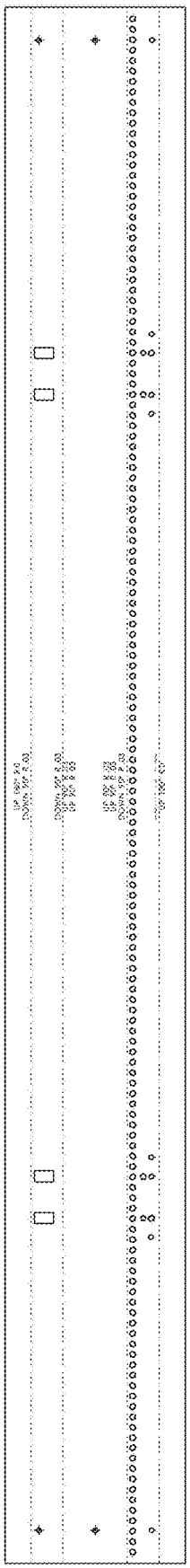

FIGS. 29A-29B schematically illustrate end and side views, respectively, of a long panel rail in accordance with certain embodiments for coupling to a backside of a preassembled solar panel module and for coupling to a pair of short rails disposed as in the example embodiment of FIG. 24.

Figure 29E:
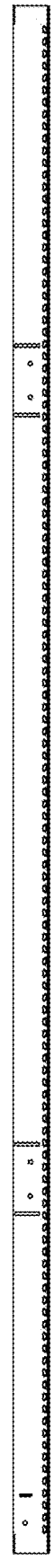

FIGS. 29C-29E schematically illustrate end, perspective and side views, respectively, of a long panel rail that is configured in accordance with certain embodiments for coupling to a backside of a preassembled solar panel module and for coupling to a pair of short rails disposed as in the example embodiments of FIG. 24.

Figure 29F:
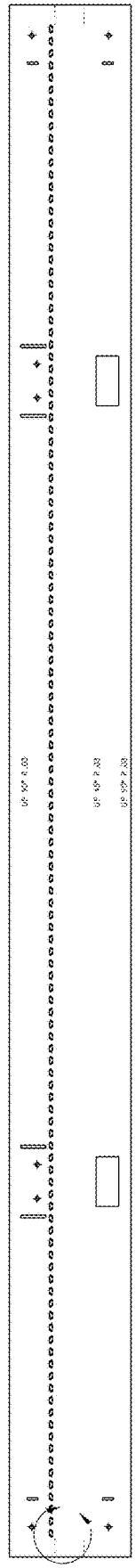

FIGS. 29F-29G schematically illustrate side and partial side views, respectively, of a long panel rail in that is configured in accordance with certain embodiments for coupling to a backside of a preassembled solar panel module and for coupling to a pair of short rails disposed as in the example embodiment of FIG. 24.

Figure 29H:
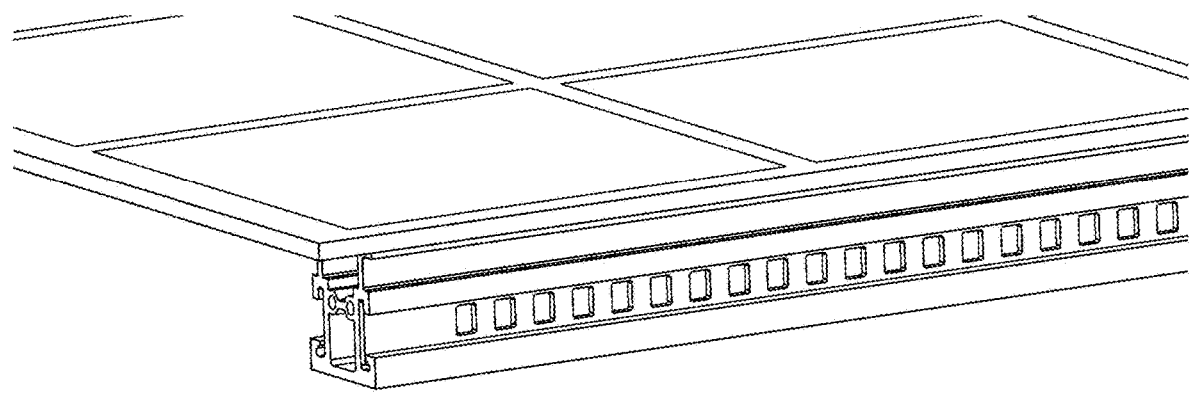
FIG. 29H schematically illustrates a partial perspective view of an at least partially preassembled solar panel module including an example embodiment of a panel rail coupled to a backside solar panel surface, wherein the panel rail shown in FIG. 29H includes an outside vertical wall that has a series of rectangular cutouts defined therein for receiving complimentary protrusions of mounting feet and/or snap connector components to prevent movement of mounting feet and/or snap connector components along the rail.

FIG. 29H schematically illustrates a partial perspective view of an at least partially preassembled solar panel module including an example embodiment of a panel rail coupled to a backside solar panel surface, wherein the panel rail shown in FIG. 29H includes an outside vertical wall that has a series of rectangular cutouts defined therein for receiving complimentary protrusions of mounting feet and/or snap connector components to prevent movement of mounting feet and/or snap connector components along the rail.

Figure 30:
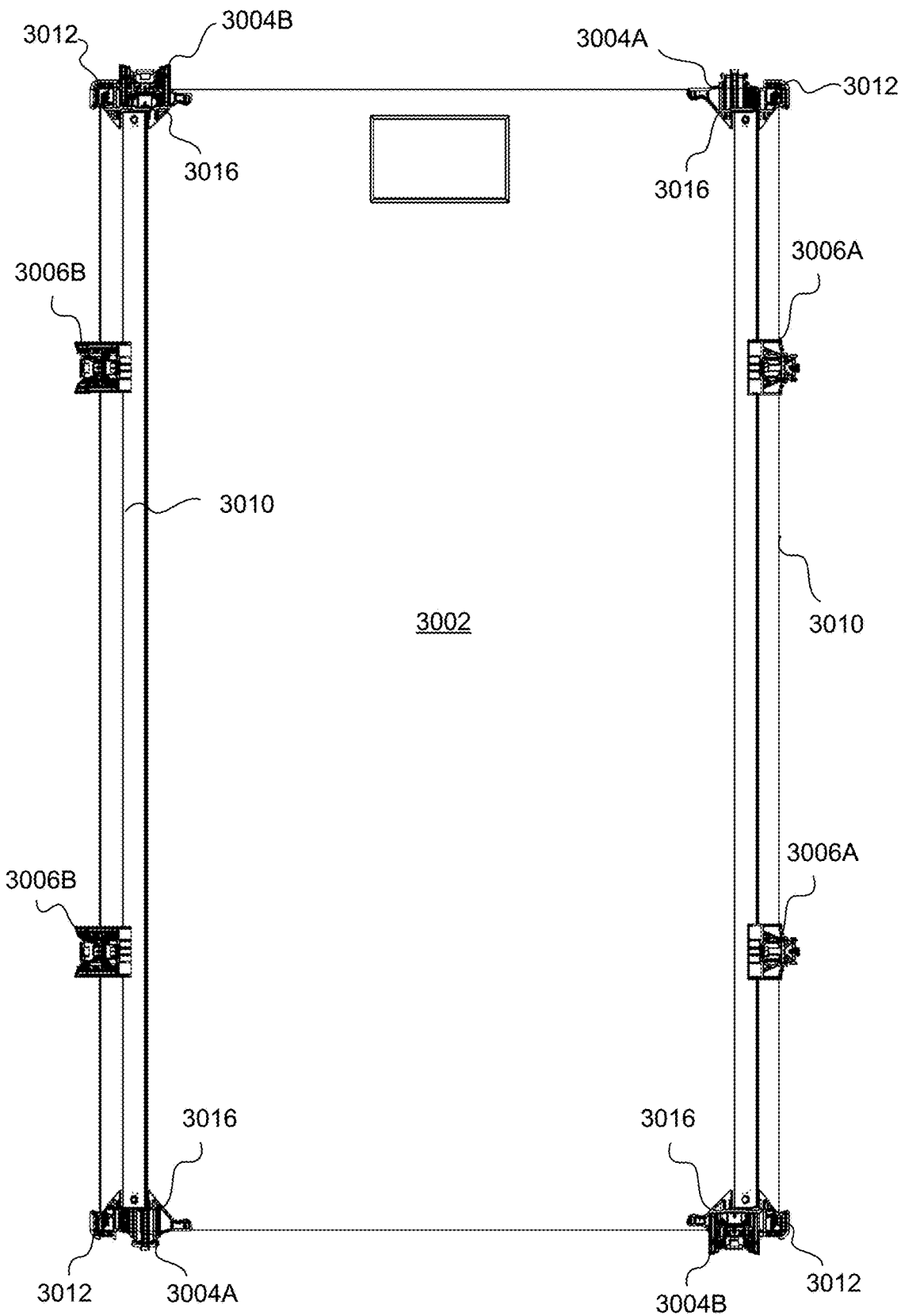
FIG. 30 schematically illustrates a preassembled solar panel module including a pair of long panel rails coupled to a backside surface and aligned with long edges of a rectangular solar panel in accordance with certain embodiments, wherein the example preassembled solar panel module illustrated schematically at FIG. 30 does not include any short rails.

FIG. 30 schematically illustrates a preassembled solar panel module 3002 that includes no short rails, just two long rails 3010, which may be replaced with two or more shorter rails that may coaxially overlap and be spaced apart along the longest edges of the preassembled solar panel module. Corner snap couplers 3004A, 3004B and/or brackets 3016 and side snap couplers 3006A, 3006B are coupled to each of the rails 3010. The snap couplers 3006A, 3006B can be coupled to the rails 3010 at the ends and/or anywhere else along the rails 3010. Mounting feet can be coupled anywhere along either or both of the rails 3010, as well, although no mounting feet are shown in FIG. 30.

LOW WIND LOADING DESIGN

In FIG. 31A, we see more embodiments showing a side view of the foot assembly including the foot base (5808), foot leg (5810) that is pinned to the foot base (either with a rigid pin or a compliant material providing flexibility at that point of connection, the track (5812), side snap connections (5814), flashing (5802) and the toggle anchor (5806)—the blind nut and the hex bolt (5804) mounting the system to the sheathing or other mounting surface (5818) and the solar module (5816). A system (or apparatus) which supports frameless or framed PV modules by a specific range of height (H) above roof and a specific range of gap (G) between PV modules which minimizes the wind loading effect on the solar array. This system (or apparatus) controls for H/G such that the ratio nears 1, which according to independent research reduces the effective wind loading on a solar array. In this apparatus, PV modules will not exceed 3" off the roof and will not have a gap less than 1.5"

A system (or apparatus) as described above and offers an aerodynamic wind deflection around the perimeter of the array.

In another example, the gap G and the height H are within the following ranges:

20 mm<G<120 mm; and 2"<H<12", which is 50 mm<H<300 mm.

In another example, 37.5 mm<G<120 mm; and 3"<H<12", which is 75 mm<H<300 mm.

In another example, 25 mm<G<120mm; and 2"<H<12", which is 75 mm<H<300 mm.

In another example, 30 mm<G<120 mm; and 2"<H<12", which is 75 mm<H<300 mm.

Installed solar panel modules of a system or array may be spaced edge to edge by between 20 mm and 120 mm, e.g., 1.5 inches. The solar panels are spaced from the surface of the roof when installed between 2-12 inches, e.g., 3-4 inches in certain embodiments.

This supports a claim requiring 0.42<H/G<15, although it does NOT support G<3" nor H>1.5" nor any specific narrower ranges of H/G closer to 1.

The height (H) may be measured between the back surface of the solar panel and the roof surface. The gap (G) may be measured between edges of adjacent solar panels.

In certain embodiments, wind deflectors 3 460, 3508 may be included on one or more sides of a solar panel module, e.g., such as are schematically illustrated at FIGS. 31B-31D. A set of wind deflectors 3460, 3508 along the perimeter of an array of multiple modules can be connected to panel rails 3710, 3711, 3810, 3811, or connected directly to snap couplers 3704A, 3704B, 3706A, 3706B of the module 3702 illustrated at FIG. 31B, or 3704A, 3704B, 3706A, 3706B of the module 3802 illustrated at FIGS. 31C-31D, or to mounting brackets 3716, 3816 particularly for sides residing on a perimeter of an array.

Several solar panel modules may be coupled together into an array using any of the preassembled solar panel modules described herein even if certain modules have not been described as being configured for coupling together with other modules into an array. Electrical current generated by solar radiation impinging upon the solar panels of the solar panel modules array and being converted to electrical energy may be passed from module to module until a power storage component is reached or until a circuit for powering lights, appliances or other electronically powered equipment is reached or until an outside power line is reached for transmitting the electrical power to the grid.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language.

While various embodiments of the present invention have been described above, it should be understood that they have been presented by way of example only, and not of limitation. The various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the such as; the term "example" is used to provide exemplary instances of the item in discussion, not an exhaustive or limiting list thereof; the terms "a" or "an" should be read as meaning "at least one," "one or more" or the such as; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Hence, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other such as phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

Thus, for example, it will be appreciated by those of ordinary skill in the art that the diagrams, schematics, illustrations, and the such as represent conceptual views or processes illustrating systems and methods in accordance with particular embodiments. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

What is claimed is:

1. An array of two or more preassembled solar panel modules, each preassembled solar panel module comprising:
   a solar panel configured for receiving and converting solar radiation to produce electrical power;
   a plurality of panel rails coupled in preassembly to a backside surface of the solar panel, including at least two panel rails disposed halfway or more along opposing longest edges of the solar panel;
   a plurality of module connector components each coupled to one of the at least two rails and to a complimentary module connector component of an adjacent preassembled solar panel module or of a wind deflector accessory, or both;
   one or more mounting feet each coupled both at a selected location to one of the at least two panel rails and at a selected location to a roof or to other sunlight receiving surface upon which said array is installed, and
   wherein $0.42<H/G<15$, where H is a height of a preassembled solar panel module measured as a spacing of said backside surface of said preassembled solar panel module from said roof or other sunlight receiving surface, and where G is a gap spacing between nearest edges of adjacent preassembled solar panel modules, and
   wherein said mounting feet each include a slider and said at least two panel rails each include a flange that does not overlap the slider in a direction normal to the preassembled solar panel module when the slider is in an open position, thereby permitting receipt of a flange end of a panel rail within a rail receiving recess defined within each of said mounting feet, wherein said flange does overlap the slider in said direction normal to the preassembled solar panel module when the slider is slid to a closed position from said open position for securing the mounting feet to the at least two panel rails.

2. The array of claim 1, wherein $0.42<H/G<3$.
3. The array of claim 1, wherein $0.42<H/G<1.5$.
4. The array of claim 1, wherein 20 mm$<G<$120 mm.
5. The array of claim 1, wherein 50 mm$<H<$300 mm.
6. The array of claim 1, wherein H$<$75 mm and G$>$37.5 mm.
7. The array of claim 1, wherein $H/G\approx 1$.
8. The array of claim 1, comprising a plurality of wind deflectors coupled to sides of preassembled solar panel modules that each define a peripheral segment of the array.
9. The array of claim 1, further comprising one or more short panel rails coupled to said backside surface of said preassembled solar panel module disposed halfway or more along opposing shortest edges of the solar panel between said at least two panel rails that are disposed at said opposing longest edges.
10. The array of claim 1, further comprising two or more short panel rails coupled to said backside surface of said preassembled solar panel module disposed halfway or more along short dimension segments spaced from either shortest edge of the solar panel between said at least two panel rails that are disposed at said opposing longest edges.
11. The array of claim 1, further comprising bumpers at corners of said preassembled solar panel modules that extend normally from said backside surface further than any of said plurality of panel rails.
12. The array of claim 1, wherein said at least two panel rails include outer facing walls with one or more features for coupling with one or more complimentary features of said mounting feet or of said snap connector components, or both, for preventing movement along said at least two panel rails of said mounting feet or of said snap connector components, or both.
13. The array of claim 12, wherein said one or more features comprise a series of notches or recesses or both.
14. The array of claim 1, wherein said solar panel comprises a frameless solar panel.
15. The array of claim 1, wherein said module connector components comprise snap connector components, and wherein adjacent solar panel modules are coupled together by coupling together complimentary snap connector components that are coupled one to each of two adjacent preassembled solar panel modules.
16. An array of two or more preassembled solar panel modules, each preassembled solar panel module comprising:
   a solar panel configured for receiving and converting solar radiation to produce electrical power;
   a plurality of panel rails coupled in preassembly to a backside surface of the solar panel, including at least two panel rails disposed halfway or more along opposing longest edges of the solar panel;
   a plurality of module connector components each coupled to one of the at least two rails and to a complimentary module connector component of an adjacent preassembled solar panel module or of a wind deflector accessory, or both;
   one or more mounting feet each coupled both at a selected location to one of the at least two panel rails and at a selected location to a roof or to other sunlight receiving surface upon which said array is installed, and
   one or more toggle anchors each comprising a rotatably-attached, elongated washer for piercing roof sheathing or other sunlight receiving surface material in a first position and rotating to a second position securing the toggle anchor after said piercing, and
   wherein $0.42<H/G<15$, where H is a height of a preassembled solar panel module measured as a spacing of said backside surface of said preassembled solar panel module from said roof or other sunlight receiving surface, and where G is a gap spacing between nearest edges of adjacent preassembled solar panel modules.
17. The array of claim 1, wherein said mounting feet include one or more pivoting features configured to provide relative movement between a pair of components to prevent or reduce strain or stress within the array.
18. The array of claim 1, wherein said mounting feet each include one or more pivoting features configured to provide relative movement of a preassembled solar panel module to prevent or reduce stress or strain from wind or snow loading or other factors by flexing about the one or more pivoting features.
19. The array of claim 1, wherein solar panel includes at least two overlapping surfaces that are configured to receive and convert solar radiation to generate electrical power.
20. The array of claim 16, wherein said mounting feet each include a slider and said at least two panel rails each include a flange that does not overlap the slider in a direction normal to the preassembled solar panel module when the slider is in an open position, thereby permitting receipt of a flange end of a panel rail within a rail receiving recess defined within each of said mounting feet, wherein said flange does overlap the slider in said direction normal to the preassembled solar panel module when the slider is slid to a closed position from said open position for securing the mounting feet to the at least two panel rails.

* * * * *